United States Patent [19]
Watanabe

[11] Patent Number: 5,530,697
[45] Date of Patent: Jun. 25, 1996

[54] CODE-DIVISION MULTIPLEX COMMUNICATION APPARATUS

[75] Inventor: Kimio Watanabe, Kawasaki, Japan

[73] Assignee: Fujitsu Limited, Kanagawa, Japan

[21] Appl. No.: 277,519

[22] Filed: Jul. 19, 1994

[30] Foreign Application Priority Data

Feb. 7, 1994 [JP] Japan .................................. 6-013267

[51] Int. Cl.[6] .................................................. H04J 13/00
[52] U.S. Cl. ............................. 370/18; 375/200; 375/205
[58] Field of Search .............................. 370/18, 84, 85.7, 370/95.1, 103; 375/200, 205, 206, 207, 210

[56] References Cited

U.S. PATENT DOCUMENTS

| | | | |
|---|---|---|---|
| 4,930,140 | 5/1990 | Cripps et al. ............................. | 370/18 |
| 5,128,959 | 7/1992 | Bruckert ................................... | 370/18 |
| 5,319,634 | 6/1994 | Bartholomew et al. .................. | 370/18 |
| 5,390,167 | 2/1995 | Inatsu et al. ............................. | 370/18 |

OTHER PUBLICATIONS

Commonly assigned U.S. pending patent application Ser. No.: 08/152,047, Filed Nov. 12, 1993.

Primary Examiner—Douglas W. Olms
Assistant Examiner—Shick Hom

[57] ABSTRACT

A PN code demodulator reduced in hardware scale and a code-division multiplex communication apparatus using the PN code demodulator are provided wherein the quantity of external noise is detected during communications and the number of multiplexed channels can be immediately changed in accordance with the quantity of external noise. In the PN code demodulator, an exclusive-OR unit derives an exclusive-OR of a PN code and a baseband signal modulated by the PN code. A counting unit counts the number of anticoincidence bits at which the baseband signal does not coincide with the PN code, based on the output of the exclusive-OR unit over a predetermined code length. A determining unit and a restoring unit restore a data signal in accordance with whether the number of anticoincidence bits counted by the counting unit has reached the value of the (predetermined code length+1)/2. A correlation value output unit obtains a correlation value based on the count value of the counting unit. In the code-division multiplex communication apparatus, the number of multiplexed channels is controlled in accordance with the correlation value.

7 Claims, 26 Drawing Sheets

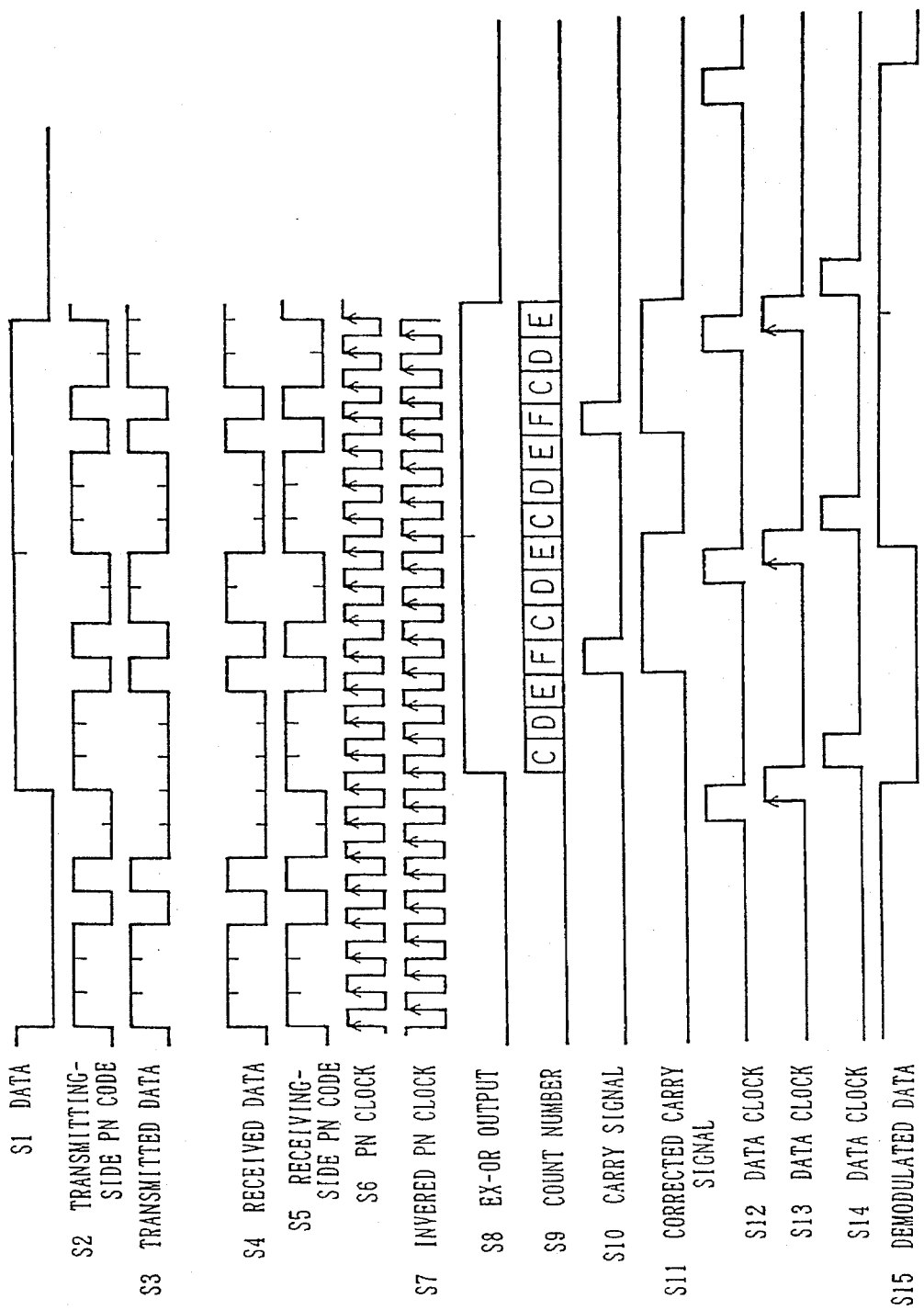

P N CODE 1

1 1 1 0 1 0 0

P N CODE 2

0 1 1 1 0 1 0

P N CODE 3

0 0 1 1 1 0 1

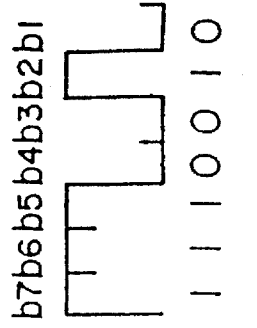
FIG. 20C PRIOR ART
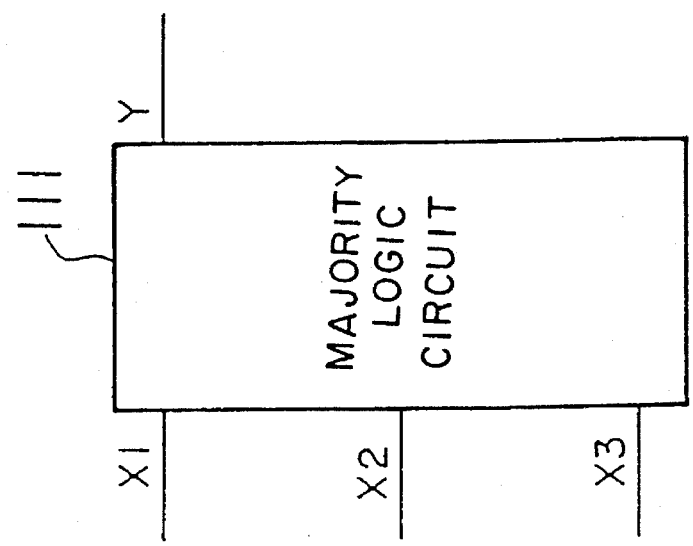
FIG. 20B PRIOR ART
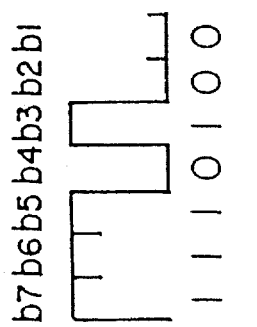
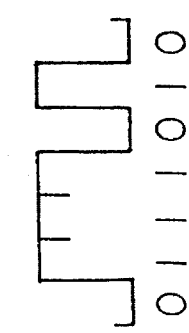
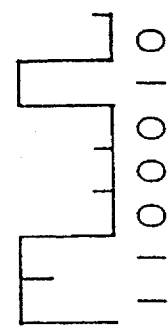
FIG. 20A PRIOR ART LOGICAL EXPRESSION
$$Y = X1 \cdot X2 + X2 \cdot X3 + X1 \cdot X3$$

TRUTH TABLE

| X1 | X2 | X3 | Y |
|----|----|----|---|
| 0  | 0  | 0  | 0 |
| 0  | 0  | 1  | 0 |
| 0  | 1  | 0  | 0 |
| 0  | 1  | 1  | 1 |
| 1  | 0  | 0  | 0 |
| 1  | 0  | 1  | 1 |
| 1  | 1  | 0  | 1 |
| 1  | 1  | 1  | 1 |

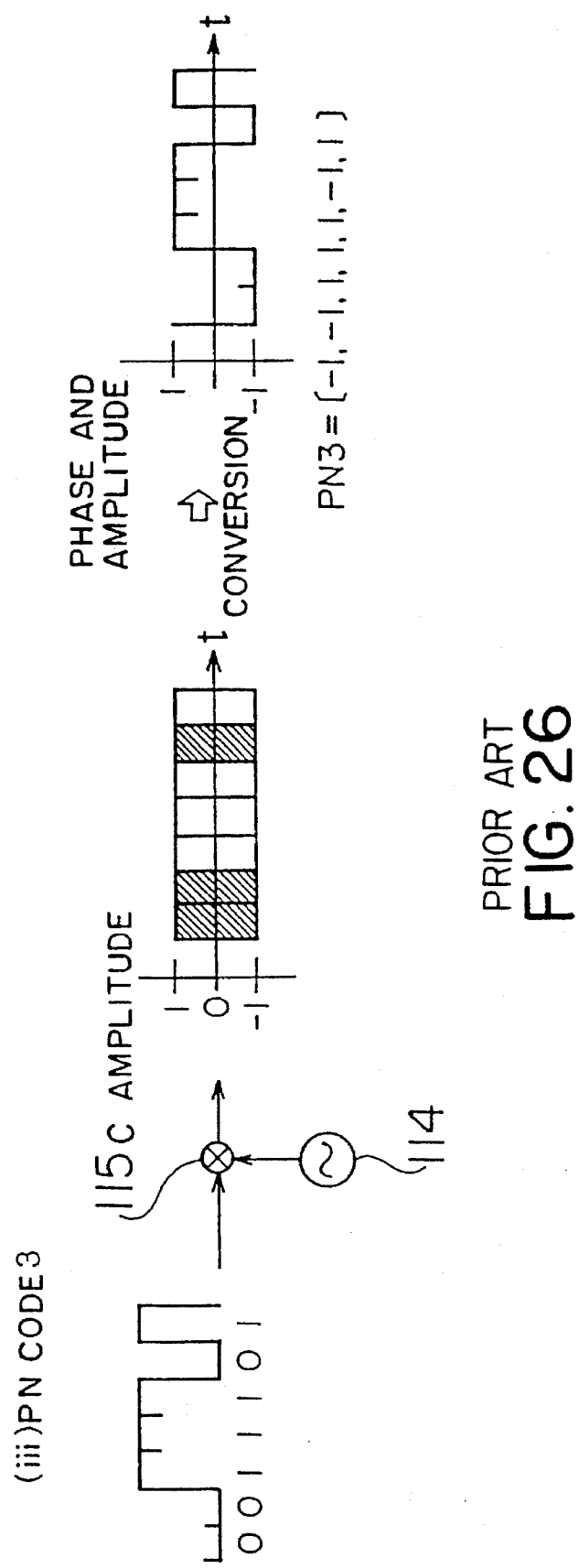

CODE-DIVISION MULTIPLEX COMMUNICATION APPARATUS

BACKGROUND OF THE INVENTION

(1) Field of the Invention

The present invention relates to a PN code demodulator and a code-division multiplex communication apparatus using the PN code demodulator, and more particularly, to a PN code demodulator for demodulating a baseband signal modulated using a PN code, and a code-division multiplex communication apparatus including a transmitting section for transmitting data signals modulated by means of a PN code via a plurality of channels and a receiving section for demodulating signals from the respective channels by means of the PN code demodulator to thereby restore the data signals.

(2) Description of the Related Art

A communication apparatus designed to carry out spread spectrum (SS) modulation by using a PN code (pseudonoise code) is known as a communication apparatus that permits multiplexing and is tolerant of interference. Thus, this type of communication apparatus is used for satellite communications dealing with feeble radio waves or in an environment wherein the strength of output radio waves is regulated.

First, the principles of spread spectrum communications and a conventional PN code demodulator for achieving the spread spectrum communications are explained.

FIG. 12 schematically illustrates a conventional spread spectrum communication system in which no multiplexing is carried out. At a transmitting side, data is modulated with a PN code by a PN code modulator 101, is further digitally modulated with a carrier wave by a binary phase-shift keying modulator (PSKMOD) 102, and then transmitted. On a receiving side, the received signal is digitally demodulated by a synchronous detector 103 and is further subjected to PN-code demodulation by a PN code demodulator 104, and the extracted information is output.

The PN code modulator 101 is composed of an exclusive-OR (EX-OR) circuit 101a and a PN code generator 101b. One bit of information and one series (one frame) of PN code associated therewith are subjected to exclusive-OR operation, whereby the resulting data is spread.

As an example of such PN code, an M-series PN code having a code length of "7" will be explained. In the case where a 7-bit PN code "1110100" is associated with a 1-bit signal "1" of data and an exclusive-OR operation is performed on these two items of data, then output data (spread data) S from the PN code modulator 101 is "0001011", as shown in FIG. 13. Where the data contains a signal "0", the resulting spread data S is "1110100".

The binary phase-shift keying modulator 102 subjects the spread data to binary phase-shift keying modulation (BPSK), and then transmits the modulated signal. As shown in FIG. 14, the binary phase-shift keying modulator 102 outputs, for example, a 0-degree phase carrier wave (blank part in the figure) for the bit "1" of the spread data S, and outputs a 180-degree phase carrier wave (shaded part in the figure) for the bit "0" of the spread data, as a transmission wave having a fixed amplitude.

On the receiving side, as shown in FIG. 15, the synchronous detector 103 converts (demodulates) the spread data, which has been subjected to the binary phase-shift keying modulation by means of the carrier wave, into a baseband signal W "0001011".

The PN code demodulator 104 serves to extract the data from the baseband signal or the spread data. As shown in FIG. 12, the PN code demodulator 104 comprises shift registers 104a corresponding in number to the code length of the PN code, a PN code generator 104b for generating in parallel PN codes which are identical with those generated by the PN code generator 101b of the transmitting side, exclusive-OR (EX-OR) circuits 104c corresponding in number to the code length of the PN code, and a majority logic circuit 104d. The PN code generator 104b includes a ROM, a switch, etc., and the majority logic circuit 104d includes a voltage adder and a majority comparator.

With this arrangement, the spread data demodulated and converted into the baseband signal W is successively input to the shift registers 104a whose number corresponds to the code length. The outputs of the shift registers 104a are supplied to the corresponding ones of the exclusive-OR circuits 104c. The exclusive-OR circuits 104c are also supplied with PN codes which are identical with those generated at the transmitting side and which are supplied in parallel from the PN code generator 104b. When the baseband signal W corresponding to one frame has been input to the shift registers 104a, the majority logic circuit 104d adds up the output voltages of the exclusive-OR circuits 104c for majority comparison.

Specifically, as shown in FIG. 16, in the case where the shift registers 104a are supplied with spread data which has been demodulated and converted into a baseband signal W "0001011", for example, the exclusive-OR circuits 104c perform exclusive-OR operations on the baseband signal W "0001011" and the PN code "1110100" and provide outputs R "1111111". The majority logic circuit 104d adds up the output bits and compares the sum "7" with the criterion value "4" which is the least majority of the total of bits (PN code length) "7". In the illustrated case, the sum is greater than the criterion value, and accordingly, the majority logic circuit 104d outputs data "1". When the sum is smaller than the majority criterion value, data "0" is output.

Thus, in spread spectrum communications, even if noise is contained in the information in the course of transmission, the information sent from the transmitting side can be reliably restored at the receiving side. In this case, the longer is the PN code length, the higher is the reliability of restoration of the data becomes at the receiving side. Although in the illustrated example, the PN code has a code length of 7 bits, the PN code usually has a code length of several hundreds to several thousands of bits.

The following explains a conventional code-division multiplex communication apparatus wherein multiplex communication is achieved by the above-described spread spectrum communication technique.

Code-division multiplex communications utilize a feature of the spread spectrum communication technique, that is, the property that a PN code, which is identical with that used at the transmitting side for the spreading, can be used for the inverse spreading (correlation) at the receiving side to extract the original signal. Namely, in cases where different PN codes (i.e., low cross-correlation codes) are used for different channels, a number of items of data can be transmitted within an identical frequency band.

FIG. 17 illustrates the basic arrangement of a conventional transmitting apparatus used for code-division multiplex communications. As illustrated, n exclusive-OR (EX-OR) circuits 110 perform exclusive-OR operations on data items 1 to n from respective channels CH1 to CHn and PN codes 1 to n, and supply exclusive-OR outputs X1 to Xn to a majority logic circuit 111. The majority logic circuit 111 determines a majority of the values of the signals belonging to the same time slot, and supplies a modulator 112 with the signal value representing the majority of the exclusive-OR outputs X1 to Xn which are binary signals. The arrangement of the majority logic circuit 111 will be described later. It is here assumed that the number of the channels is an odd number (n: odd number).

The modulator 112 comprises a double balanced modulator (DBM) 112a and an amplifier 112b. The double balanced modulator 112a subjects a carrier wave to phase modulation by using the output of the majority logic circuit 111, and the amplifier 112b subjects the modulated signal to RF amplification for transmission.

The above transmitting apparatus will be now explained in more detail on the assumption that the PN code used is an M-series PN code having a maximum-length connection tap of [3, 1] and a code length of "7". Also, it is assumed that the number of channels is three. Namely, as shown in FIG. 18, PN codes 1, 2 and 3 are respectively "1110100", "0111010" and "0011101".

The PN codes 1 to 3 are supplied to three exclusive-OR circuits 110, respectively, as shown in FIG. 19, and the exclusive-OR circuits 110 are also supplied with data "0", "0" and "1", for example, from three channels CH1 to CH3. In each exclusive-OR circuit 110, one frame of the PN code is associated with one bit of the data transmitted from the corresponding channel.

Consequently, the data on the channel CH1 is converted to a signal X1 "1110100", the data on the channel CH2 is converted to a signal X2 "0111010", and the data on the channel CH3 is converted to a signal X3 "1100010".

The majority logic circuit 111 determines a majority of the signals X1 to X3 of the channels on a bit-by-bit basis. According to the majority determination, the value "1" is output when a majority of the binary signals supplied in parallel from the channels has the value "1", and the value "0" is output when a majority of the binary signals has the value "0". Specifically, as shown in FIG. 20, at timing $b_1$, the signals X1 to X3 of the channels CH1 to CH3 are all "0", and thus the output Y of the majority logic circuit 111 is "0". At timing $b_2$, the signal X1 of the channel CH1 is "0" while the signals X2 and X3 of the channels CH2 and CH3 are "1". Since a majority of the signals have the value "1", the output Y of the majority logic circuit 111 is "1". The PN code corresponding to one frame is subjected to majority operation in this manner, and the result "1110010" is obtained.

The majority logic circuit 111 can be constituted by a combination of AND gates and an OR gate, as shown in FIG. 21(A). FIG. 21(B) illustrates a logical expression employed in the majority logic circuit 111, and FIG. 21(C) illustrates a truth table of the circuit 111.

The output Y of the majority logic circuit 111 is subjected to binary phase-shift keying modulation by the double balanced modulator 112a, as shown in FIG. 22. In the amplitude characteristic shown in the figure, the blank part indicates a 0-degree phase carrier wave having a fixed amplitude, and the shaded part indicates a 180-degree phase carrier wave having the fixed amplitude. For better understanding of the correlation of codes of the transmitted wave, amplitude is converted such that the 0-degree phase and the 180-degree phase are shown on the plus (+) and minus (−) sides, respectively, of the vertical axis. The converted transmission wave W is expressed as "1, 1, 1, −1, −1, 1, −1".

A conventional receiving apparatus used for code-division multiplex communications will be now explained.

FIG. 23 illustrates the basic arrangement of a conventional receiving apparatus for code-division multiplex communications. In the figure, PN code generators 113a to 113c output PN codes 1 to 3 respectively identical with the PN codes 1 to 3 generated in the aforementioned transmitting apparatus. Double balanced modulators 115a to 115c previously subject an oscillation signal from a local oscillator 114 to phase modulation, by using the PN codes 1 to 3, respectively. Using the outputs of the double balanced modulators 115a to 115c, another set of double balanced modulators 116a to 116c acquires a correlation with the transmitted wave from the transmitting side for the individual channels. The data of each channel is passed through a band-pass filter 117a, 117b or 117c having a frequency band characteristic approximately twice the data rate, whereby each of PSK demodulators 118a to 118c is supplied with the result (integral) of the correlations over one frame of the PN code as an amplitude output. The PSK demodulators 118a to 118c demodulate data 1 to 3 by means of synchronous detection.

As shown in FIG. 24, the double balanced modulator 115a previously subjects the oscillation signal from the local oscillator 114 to phase modulation by using the PN code 1 "1110100", and outputs the converted signal PN1 "1, 1, 1, −1, 1, −1, −1". Similarly, the double balanced modulator 115b previously subjects the oscillation signal from the local oscillator 114 to phase modulation by using the PN code 2 "0111010", and outputs the converted signal PN2 "−1, 1, 1, 1, −1, 1, −1", as shown in FIG. 25. Further, as shown in FIG. 26, the double balanced modulator 115c previously subjects the oscillation signal from the local oscillator 114 to phase modulation by using the PN code 3 "0011101", and outputs the converted signal PN3 "−1, −1, 1, 1, 1, −1, 1".

Detecting the correlations at the double balanced modulators 116a to 116c and determining the data on the basis of the results of integration from the bandpass filters 117a to 117c is equivalent to acquiring the inner product of the waveform of the received wave W "1, 1, 1, −1, −1, 1, −1" and each of the converted signals PN1 to PN3.

Namely, for the channel CH1, $$W \cdot PN1 = [1, 1, 1, -1, -1, 1, -1][1, 1, 1, -1, 1, -1, -1]$$
$$= +3$$

for the channel CH2, $$W \cdot PN2 = [1, 1, 1, -1, -1, 1, -1][-1, 1, 1, 1, -1, 1, -1]$$
$$= +3$$

and for the channel CH3, $$W \cdot PN3 = [1, 1, 1, -1, -1, 1, -1][-1, -1, 1, 1, 1, -1, 1]$$
$$= -5$$

In this case, if the result of calculation has a positive sign (+), "0" is restored as data, and if the result of calculation has a negative sign (−), "1" is restored as data.

Thus, the data "0", "0" and "1" of the transmitting side can be reliably restored. In other words, multiplex communication is carried out by using the spread spectrum communication technique.

Using the majority logic circuit 111 in the transmitting apparatus leads to reduction in the quantity of hardware, as compared with an existing transmitting apparatus in which an ordinary adder circuit is arranged subsequently to the three exclusive-OR circuits 110, and an easy-to-adjust communication apparatus can be provided.

The conventional PN code demodulator 104 for a spread spectrum communication system, however, requires unit registers including the shift registers 104a and the exclusive-OR circuits 104c respectively corresponding in number to the PN code length. The PN code usually has a code length of several hundreds to several thousands of bits, as mentioned above. This means that the PN code demodulator requires a considerable scale of hardware and thus is not suited for practical use.

Further, in the conventional code-division multiplex communications, the number of channels that can be multiplexed generally depends upon external noise, and the number of multiplexed channels must be reduced as the code error rate increases. Particularly in an environment in which the quantity of external noise changes with time, it is necessary that the number of multiplexed channels be changed at any point of time. For example, in the course of error-free communications by means of feeble radio waves within a mobile communication band, the communication may suddenly fail due to interference with nearby mobile communications. To cope with such situations, a flexible system is demanded which is able to immediately change the number of multiplexed channels in accordance with the quantity of external noise.

However, the conventional code-division multiplex communication apparatus is unable to detect the quantity of external noise during communications, and accordingly, the number of multiplexed channels cannot be changed immediately in accordance with the quantity of external noise.

SUMMARY OF THE INVENTION

An object of the present invention is to provide a PN code demodulator reduced in the scale of hardware.

Another object of the present invention is to provide a code-division multiplex communication apparatus which is capable of detecting the quantity of external noise during communications and immediately changing the number of multiplexed channels in accordance with the quantity of external noise.

To achieve the above objects, the present invention provides a PN code demodulator for demodulating a baseband signal modulated by means of a PN code. The PN code demodulator comprises PN code generating means for generating a PN code having a predetermined code length and identical with that generated at a modulating side, exclusive-OR means for deriving an exclusive-OR of the PN code generated by the PN code generating means and the baseband signal modulated by means of the PN code, counting means for counting a number of anticoincidence bits at which the baseband signal does not coincide with the PN code, based on an output of the exclusive-OR means over the predetermined code length, determining means for outputting a detection signal when the number of anticoincidence bits counted by the counting means has reached a value of (the predetermined code length+1)/2, and restoring means for restoring a data signal in accordance with the detection signal output from the determining means.

The present invention also provides a code-division multiplex communication apparatus including a transmitting section for modulating data signals by means of PN codes and transmitting the modulated signals via a plurality of channels, respectively, and a receiving section for demodulating received signals by means of PN codes to restore the data signals associated with the respective channels. The code-division multiplex communication apparatus comprises a plurality of transmitting-side PN code generating means provided at the transmitting section and associated with the respective channels, for generating respective different PN codes having a predetermined code length, a plurality of transmitting-side exclusive-OR means provided at the transmitting section and associated with the respective channels, for individually deriving an exclusive-OR of a corresponding data signal and the PN code generated by a corresponding one of the transmitting-side PN code generating means, majority determining means provided at the transmitting section, for controlling a multiplex number in accordance with a multiplex number control signal supplied thereto and for determining a majority of outputs of the transmitting-side exclusive-OR means on a time-slot basis to output a multiplex data signal, digital modulating means provided at the transmitting section, for digitally modulating a carrier wave by means of the multiplex data signal supplied from the majority determining means, digital demodulating means provided at the receiving section, for digitally demodulating the multiplex data signal from a received signal, a plurality of receiving-side PN code generating means provided at the receiving section and associated with the respective channels, for respectively generating PN codes identical with those generated by corresponding ones of the transmitting-side PN code generating means, a plurality of receiving-side exclusive-OR means provided at the receiving section and associated with the respective channels, for individually deriving an exclusive-OR of the multiplex data signal demodulated by the digital demodulating means and the PN code generated by a corresponding one of the receiving-side PN code generating means, a plurality of PN code demodulating means provided at the receiving section and associated with the respective channels, for individually demodulating the PN code in accordance with an output from a corresponding one of the receiving-side exclusive-OR means and for obtaining a correlation value for each predetermined code length, and multiplex number control means for generating the multiplex number control signal in accordance with the correlation values obtained by the PN code demodulating means and supplying the generated multiplex number control signal to the majority determining means provided at the transmitting section.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 is a timing chart showing signal waveforms at various parts in the PN code demodulator;

FIG. 20 is a diagram illustrating the operation of a majority logic circuit;

FIG. 26 is a diagram illustrating the phase modulation of still another PN code.

DESCRIPTION OF THE PREFERRED EMBODIMENTS

Embodiments of the present invention will be described with reference to the drawings.

Prior to the description of the embodiments, the principles of the present invention are explained first.

Figure 1:
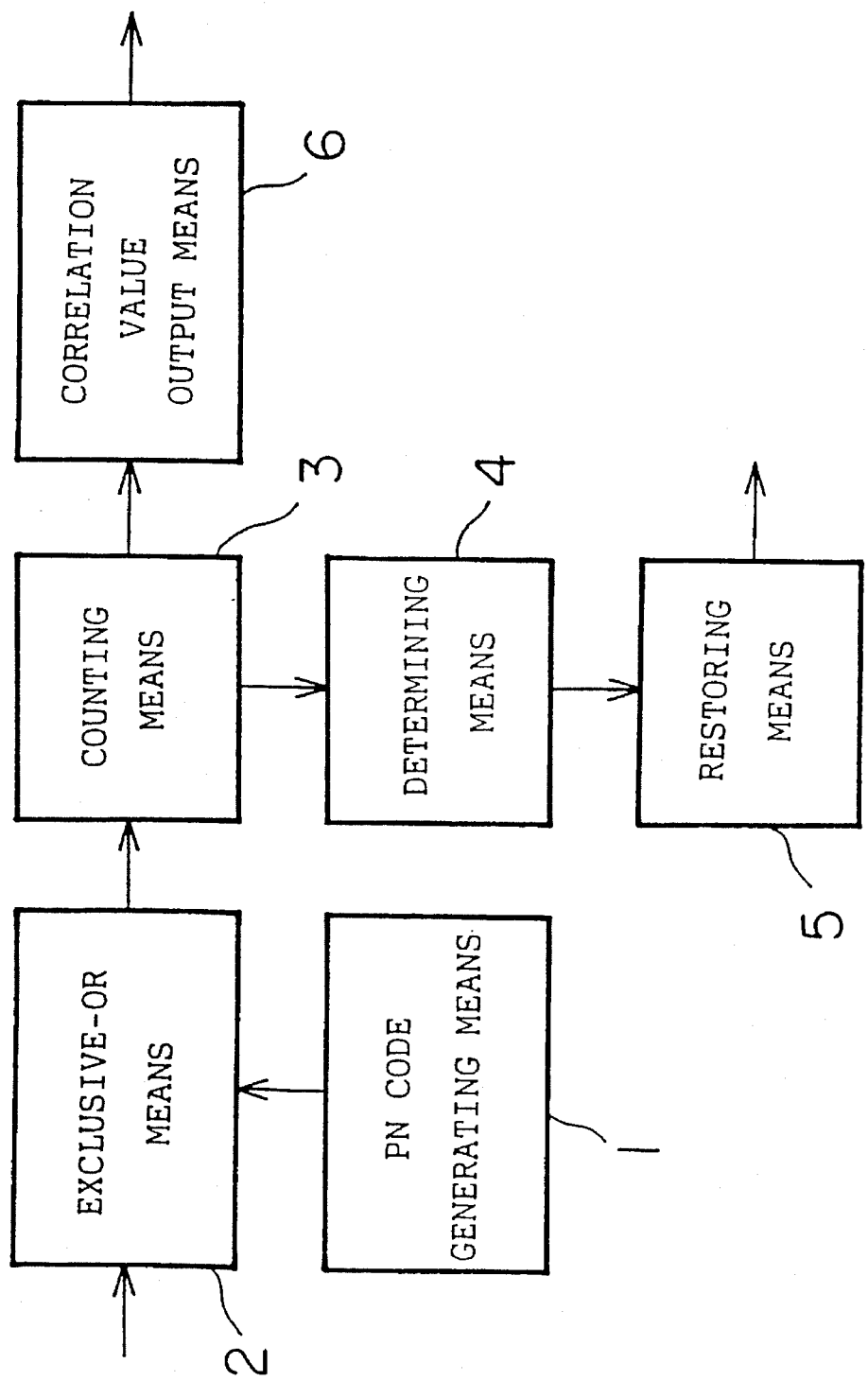
FIG. 1 is a diagram illustrating first principles of the present invention.

As shown in FIG. 1, according to the present invention, there is provided a PN code demodulator which comprises PN code generating means 1 for generating a PN code having a predetermined code length and identical with that generated at a modulating side, exclusive-OR means 2 for deriving an exclusive-OR of the PN code generated by the PN code generating means 1 and a baseband signal modulated by the PN code, counting means 3 for counting a number of anticoincidence bits at which the baseband signal does not coincide with the PN code, based on an output of the exclusive-OR means 2 over the predetermined code length, determining means 4 for outputting a detection signal when the number of anticoincidence bits counted by the counting means 3 has reached a value of (predetermined code length+1)/2, and restoring means 5 for restoring a data signal in accordance with the detection signal output from the determining means 4.

Figure 2:
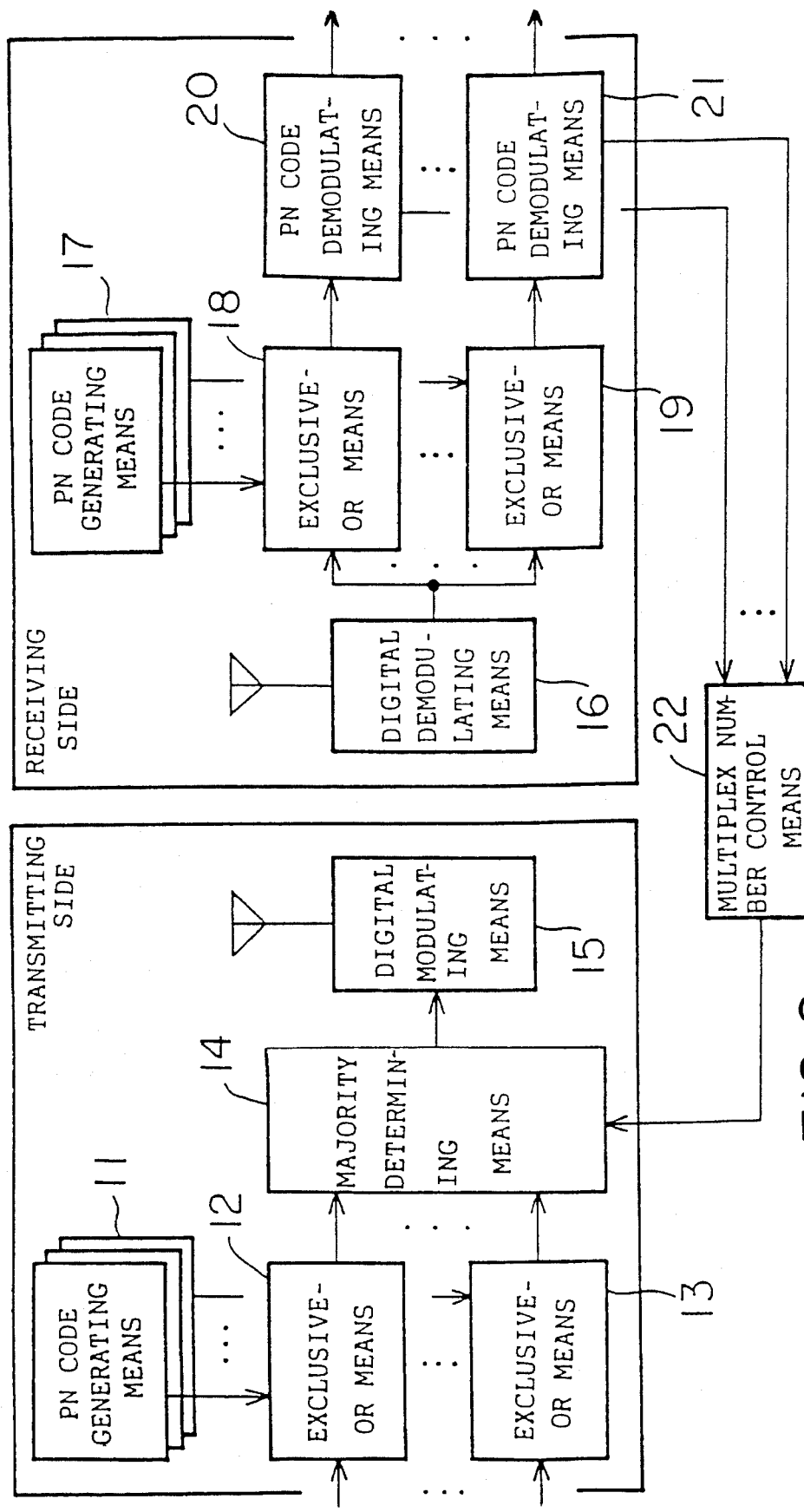
FIG. 2 is a diagram illustrating second principles of the present invention.

As shown in FIG. 2, the present invention also provides a code-division multiplex communication apparatus which comprises a plurality of PN code generating means 11 provided at a transmitting side and associated with respective channels, for generating respective different PN codes having a predetermined code length., a plurality of exclusive-OR means 12–13 provided at the transmitting side and associated with the respective channels, for individually deriving an exclusive-OR of a corresponding data signal and the PN code generated by the corresponding PN code generating means, majority determining means 14 provided at the transmitting side, for controlling a multiplex number in accordance with a multiplex number control signal supplied thereto and for determining a majority of outputs of the exclusive-OR means 12–13 on a time-slot basis to output a multiplex data signal, digital modulating means 15 provided at the transmitting side, for digitally modulating a carrier wave by means of the multiplex data signal supplied from the majority determining means 14, digital demodulating means 16 provided at a receiving side, for digitally demodulating the multiplex data signal from a received signal, a plurality of PN code generating means 17 provided at the receiving side and associated with the respective channels, for respectively generating PN codes identical with those generated by corresponding ones of the transmitting-side PN code generating means, a plurality of exclusive-OR means 18–19 provided at the receiving side and associated with the respective channels, for individually deriving an exclusive-OR of the multiplex data signal demodulated by the digital demodulating means 16 and the PN code generated by a corresponding one of the receiving-side PN code generating means, a plurality of PN code demodulating means 20–21 provided at the receiving side and associated with the respective channels, for individually demodulating the PN code in accordance with an output from the corresponding exclusive-OR means and for obtaining a correlation value for each predetermined code length, and multiplex number control means 22 for generating the multiplex number control signal in accordance with the correlation values obtained by the PN code demodulating means 20–21 and supplying the generated multiplex number control signal to the majority determining means 14 provided at the transmitting side.

In the arrangement of the PN code demodulator shown in FIG. 1, the exclusive-OR means 2 derives an exclusive-OR of the PN code generated by the PN code generating means 1 and the baseband signal modulated by means of the PN code. When obtaining the exclusive-OR, one bit of data contained in the baseband signal is associated with one frame of the PN code, whereby the data is spread.

Based on the output from the exclusive-OR means 2, the counting means 3 counts the number of anticoincidence bits at which the baseband signal does not coincide with the PN code, over the predetermined code length. When the number of anticoincidence bits counted by the counting means 3 has reached the value (predetermined code length+1)/2, the determining means 4 outputs the detection signal. In cases where no external noise exists in the transmission path, the number of anticoincidence bits corresponds to the predetermined code length. Even in the event external noise exists, an accurate detection signal can be output as long as the number of anticoincidence bits remains smaller than half of the predetermined code length.

In accordance with the detection signal from the determining means 4, the restoring means 5 restores the data signal.

This PN code demodulator does not require shift registers or exclusive-OR circuits corresponding in number to the PN code length, and accordingly, the hardware can be reduced in size.

In the code-division multiplex communication apparatus of FIG. 2 using the PN code demodulator, the transmitting-side exclusive-OR means 12–13 individually derive an exclusive-OR of the corresponding data signal and the PN code generated by the corresponding PN code generating means, whereby the data signal is spread. Based on the multiplex number control signal supplied from the multiplex number control means 22, the majority determining means 14 determines a majority of the outputs from the exclusive-OR means 12–13 on a time-slot basis, and then outputs the multiplex data signal. Specifically, among the binary signals supplied in parallel from the exclusive-OR means 12–13, a majority of the signal values is detected by the majority determining means 14, which then outputs the majority signal as the multiplex data signal.

Using the multiplex data signal from the majority determining means 14, the digital modulating means 15 digitally modulates the carrier wave.

On the receiving side, the digital demodulating means 16 digitally demodulates the multiplex data signal from the received signal. The exclusive-OR means 18–19 individually derive an exclusive-OR of the multiplex data signal demodulated by the digital demodulating means 16 and the PN code generated by a corresponding one of the receiving-side PN code generating means. Based on the outputs from corresponding ones of the exclusive-OR means 18–19, the PN code demodulating means 20–21 each demodulate the PN code and obtain a correlation value for each predetermined code length. The demodulation of the PN codes is accomplished by an operation similar to that carried out by the counting means 3, determining means 4 and restoring means 5 shown in FIG. 1. As the correlation value, the number of anticoincidence bits counted by the counting means 3 for the predetermined code length is used.

The multiplex number control means 22 generates the multiplex number control signal based on the correlation values obtained by the PN code demodulating means 20–21 individually, and supplies the generated signal to the majority determining means 14 on the transmitting side. The multiplex number control signal is generated in such a manner that the number of multiplexed channels is reduced when the correlation values decrease, and is increased when the correlation values increase.

Thus, the correlation values corresponding to external noise can be detected in the course of communications. Further, since the number of multiplexed channels can be changed in accordance with the correlation values, a communication apparatus with excellent transmission quality can be provided.

The embodiments of the present invention will be now described in detail.

Figure 3:
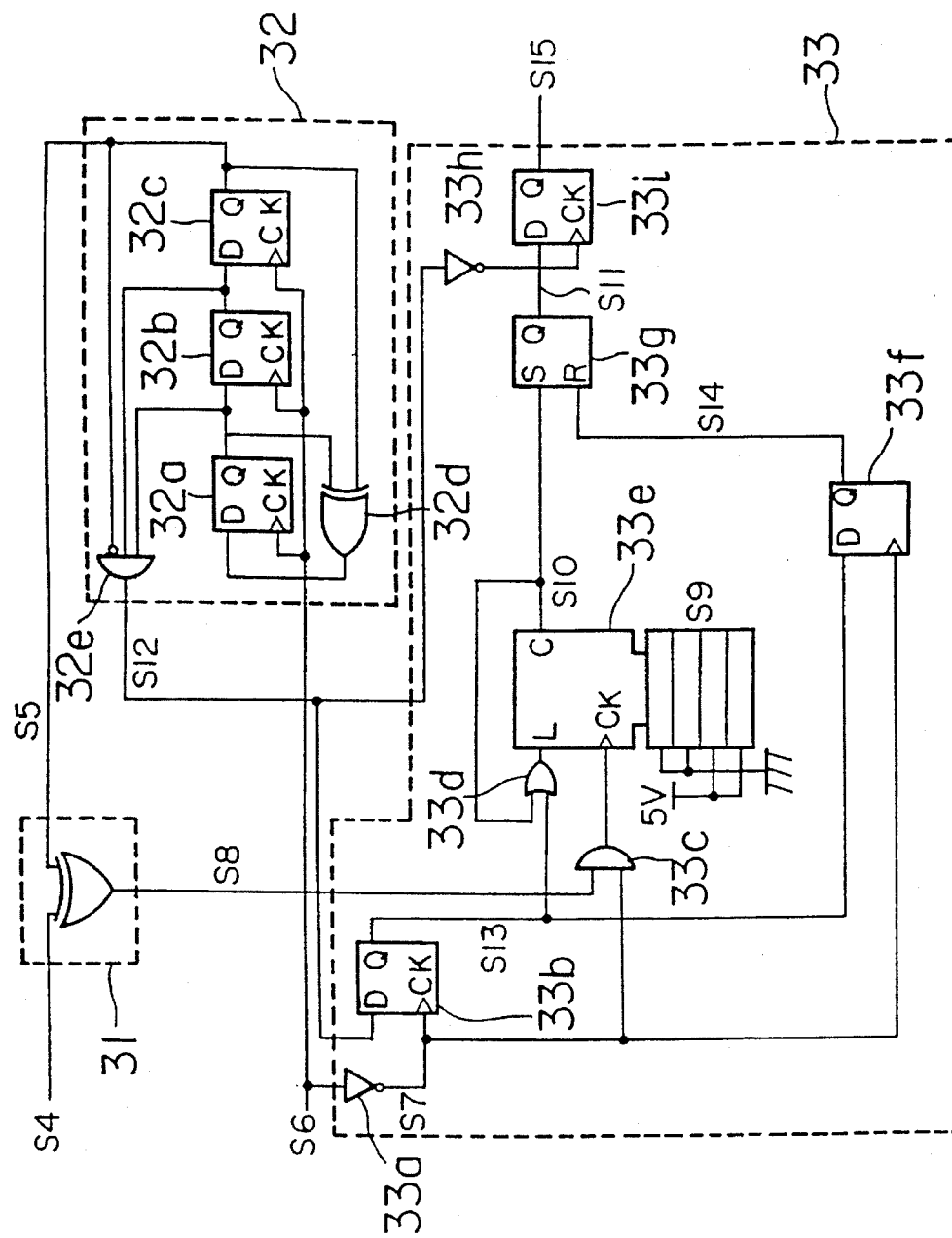
FIG. 3 is a block diagram showing the circuitry of a PN code demodulator according to a first embodiment of the present invention.

FIG. 3 is a block diagram showing the circuitry of a PN code demodulator according to a first embodiment of the present invention. The PN code demodulator comprises an exclusive-OR (EX-OR) operation section 31, an PN code generating section 32, and a threshold number counting section 33. The exclusive-OR operation section 31 is supplied with received data S4, which is in the form of a baseband signal converted by a synchronous detector or the like, not shown, and also with a PN code S5 from the PN code generating section 32 synchronized with a transmitting side.

The PN code generating section 32 is composed of three D flip-flops (FF) 32a to 32c, an EX-OR circuit 32d, and an AND circuit 32e. The three D-FFs 32a to 32c and the EX-OR circuit 32d generate the PN code S5 which is identical to the PN code used in a PN code modulating section of the transmitting side, based on a PN clock pulse S6 supplied thereto, and the AND circuit 32e generates a data clock pulse S12 indicating one bit of data (one frame of the PN code). The PN clock pulse S6 is extracted from the received wave, or is generated by another communication means in synchronism with a clock signal associated with the transmitting-side PN code. The PN code used in the PN code modulating section of the transmitting side has a code length corresponding to an odd number; hence the PN code S5 has a code length corresponding to the odd number.

The threshold number counting section 33 is composed of an inverter 33a, a D-FF 33b, an AND circuit 33c, an OR circuit 33d, a counter 33e, a D-FF 33f, an SR-FF 33g, an inverter 33h, and a D-FF 33i. Referring to FIG. 4, the arrangement and operation of the threshold number counting section 33 will be explained in detail.

FIG. 4 is a timing chart showing signal waveforms at various parts in the PN code demodulator. It is assumed that data sent from the transmitting side to the receiving side is S1 and the transmitting-side PN code is S2, for example. Transmission data S3 is obtained by performing an exclusive-OR operation on S1 and S2.

In the case where the transmitted data S3 is not influenced by external noise, the exclusive-OR operation section 31 is supplied with data S4. On the other hand, the PN clock pulse S6 is supplied to the PN code generating section 32, which in turn supplies the PN code S5 to the exclusive-OR operation section 31. Also, the data clock pulse S12 is supplied from the AND circuit 32e of the PN code generating section 32 to the D-terminal of the D-FF 33b and the inverter 33h. The output of the exclusive-OR operation section 31 is indicated at S8.

The clock (CK) terminal of the D-FF 33b is supplied with an inverted PN clock pulse S7. The inverted PN clock pulse S7 is obtained by inverting the PN clock pulse S6 at the inverter 33a. Thus, a data clock pulse S13, which is delayed by one bit of the PN clock pulse, is output from the output (Q) terminal of the D-FF 33b and is supplied to the OR circuit 33d and the D terminal of the D-FF 33f.

The AND circuit 33c is supplied with the inverted PN clock pulse S7 and the output S8 of the exclusive-OR operation section 31, and outputs the result of the AND operation to the CK terminal of the counter 33e. The carry (C) terminal of the counter 33e is connected to an input of the OR circuit 33d, the output of which is connected to the load (L) terminal of the same counter 33e. The counter 33e is constructed such that "1100" ("C" in hexadecimal notation) is set in a counter section thereof when a pulse is input to the CK terminal after application of a high-level load signal to the L terminal. The pulses input thereafter to the CK terminal are successively added to the value "1100" by the counter 33e, and when the value of the counter section reaches "1111" ("F" in hexadecimal notation), the counter 33e outputs a carry signal S10 from the C terminal thereof. In FIG. 4, the count value S9 of the counter 33e is expressed in hexadecimal notation. The value obtained by subtracting "1011" (="1100"−1) from "1111", that is, "4", equals (the PN code length "7"+ 1)/2. Namely, the counter 33e counts the number of anticoincidence bits at which the received data S4 does not coincide with the PN code S5, and outputs the carry signal S10 when the number of anticoincidence bits reaches a majority "4" of the code length "7".

Since the inverted PN clock pulse S7 is supplied to the CK terminal of the D-FF 33f, a data clock pulse S14, which is delayed from the data clock pulse S13 by one bit of the PN clock pulse, is output from the Q terminal of the D-FF 33f to the R terminal of the SR-FF 33g. The SR-FF 33g is also supplied with the carry signal S10 at the S terminal thereof, and thus a corrected carry signal S11 is output from the Q terminal of the SR-FF 33g to the D terminal of the D-FF 33i. A signal obtained by inverting the data clock pulse S12 at the inverter 33h is supplied to the CK terminal of the D-FF 33i, and accordingly, demodulated data S15 is output from the Q terminal of the D-FF 33i. Namely, the demodulated data S15 is equivalent to the data S1 of the transmitting side and is delayed therefrom by one bit. Thus, the data S1 can be reliably restored at the receiving side.

Even if noise is contained in the data S4 during transmission, information can be restored with reliability as long as the number of noise-affected bits is "3" at most in the case where the PN code length is "7". More generally, where the PN code length is n, data can be reliably restored as long as the number of noise-affected bits is smaller than or equal to $[(n+1)/2-1]$.

As described above, the PN code demodulator does not require shift registers or exclusive-OR circuits corresponding in number to the PN code length, and thus the hardware can be reduced in size.

A code-division multiplex communication apparatus according to a second embodiment of the present invention will be now described. The apparatus of the second embodiment uses the demodulator of the first embodiment, and includes a communication device for up channels CH1 to CH3 and a communication device for down channels CH4 to CH6.

Figure 5A:
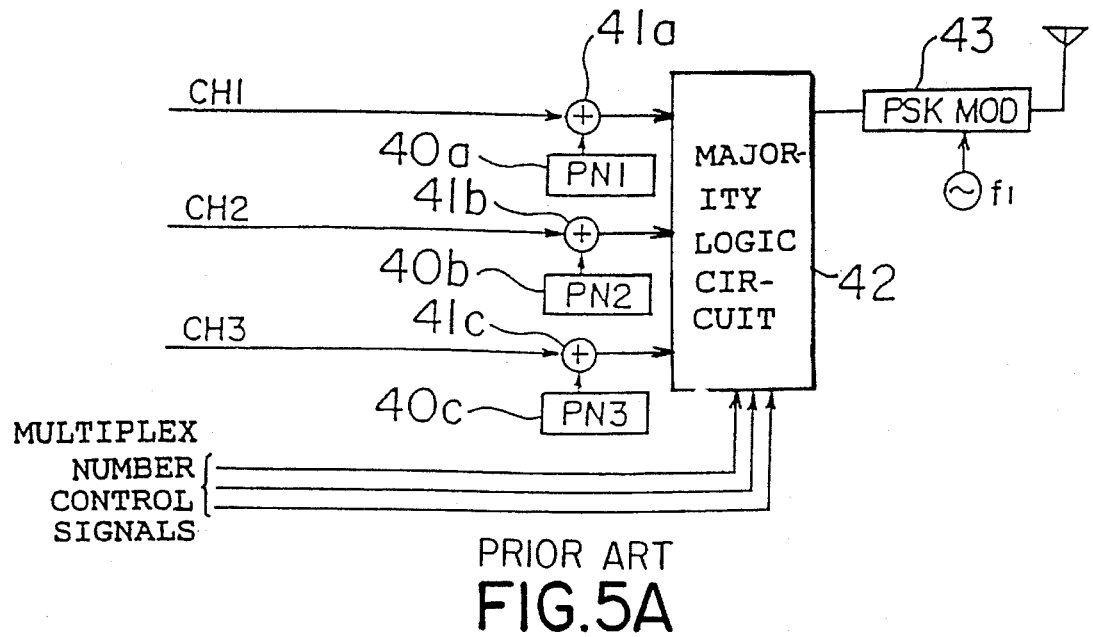
FIG. 5(A) is a diagram schematically showing the arrangement of a transmitting section of a communication device for up channels CH1 to CH3.
Figure 5B:
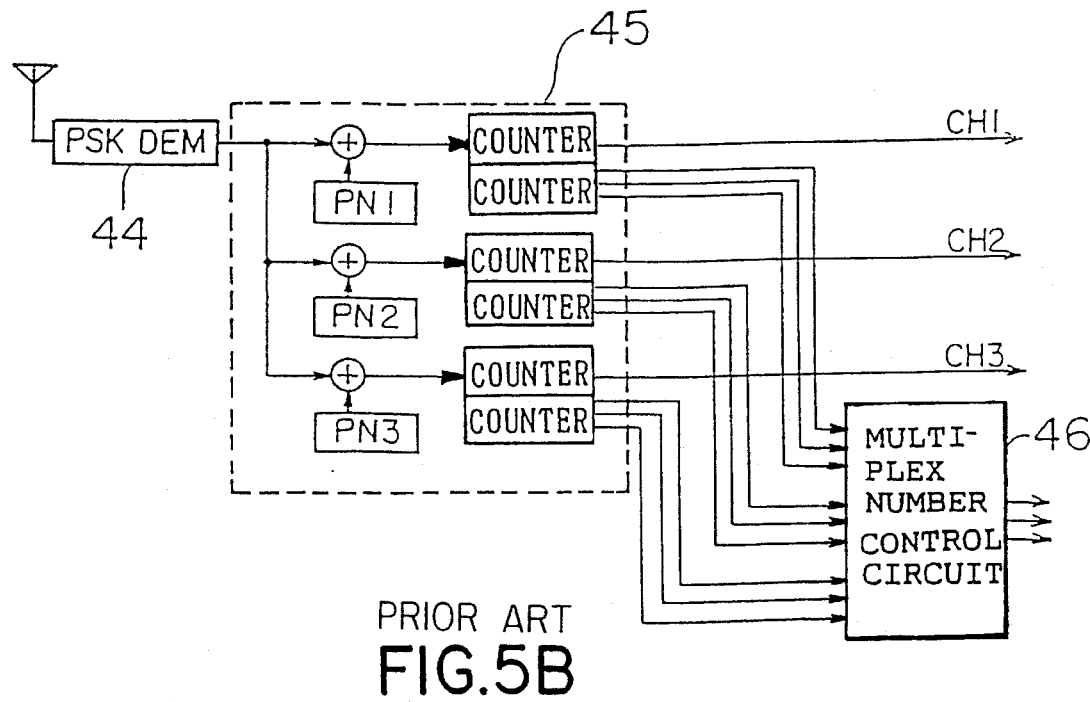
FIG. 5(B) is a diagram schematically showing the arrangement of a receiving section of the communication device for the up channels CH1 to CH3.
Figure 17:
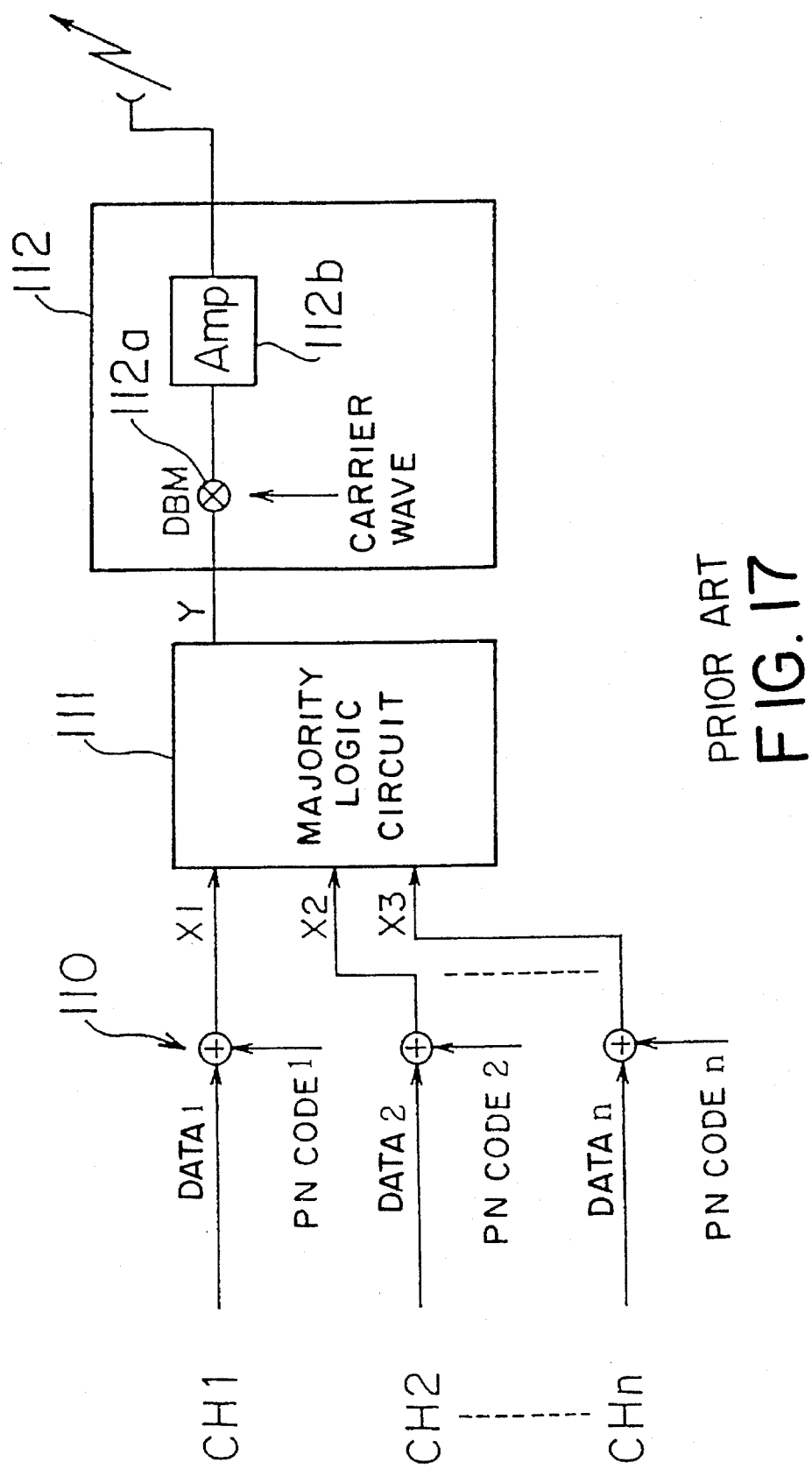
FIG. 17 is a diagram showing the basic arrangement of a conventional transmitting apparatus used for code-division multiplex communications.
Figure 18A:
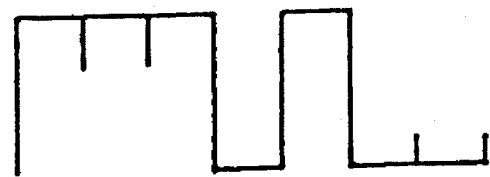
FIG. 18 is a diagram illustrating PN codes.
Figure 18B:
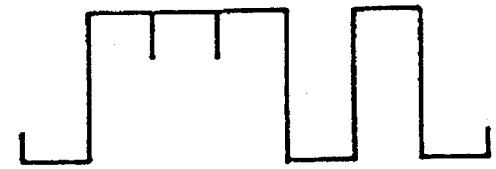
Figure 18C:
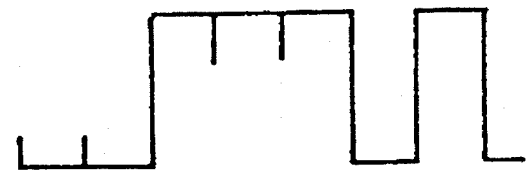
Figure 19A:
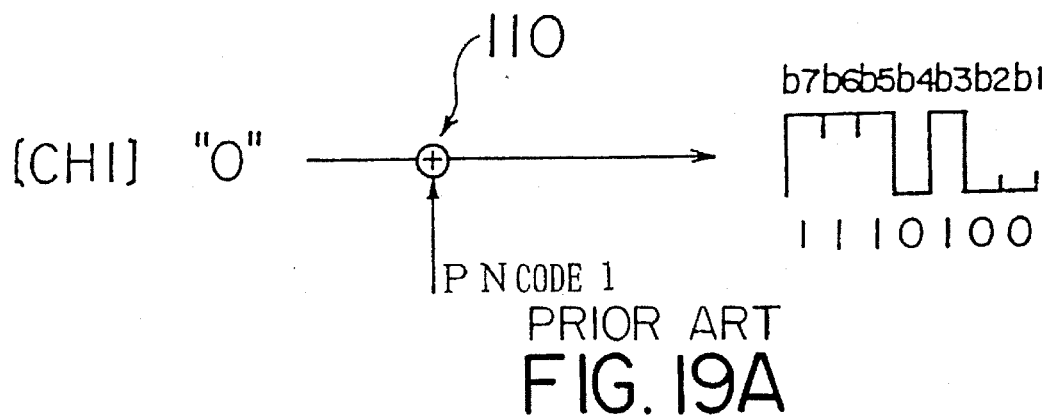
FIG. 19 is a diagram illustrating the operation of exclusive-OR circuits.
Figure 19B:
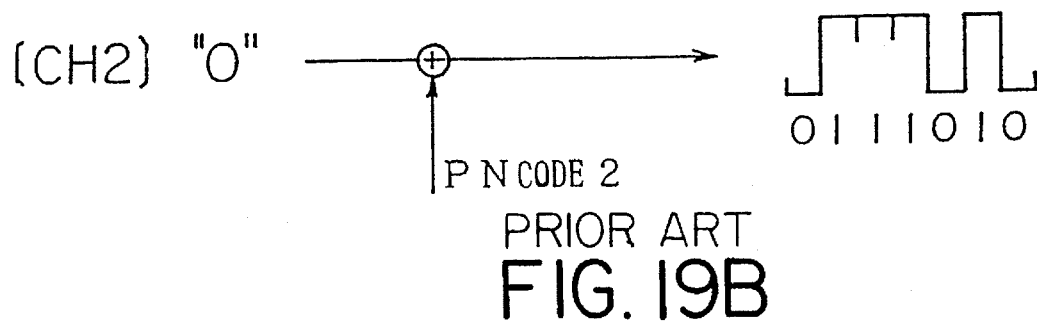
Figure 19C:
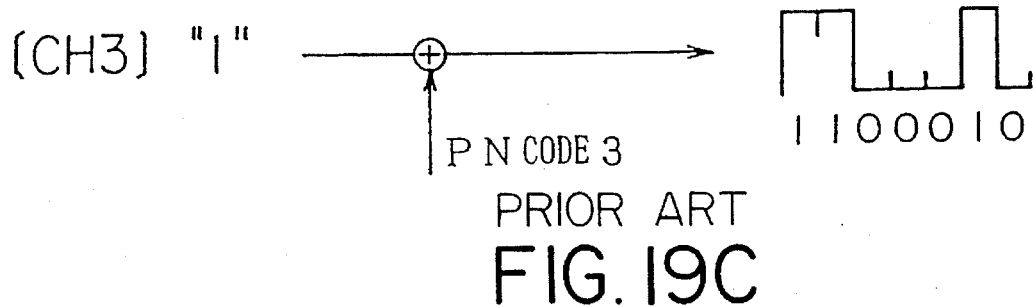
Figures 21A, 21B, 21C:
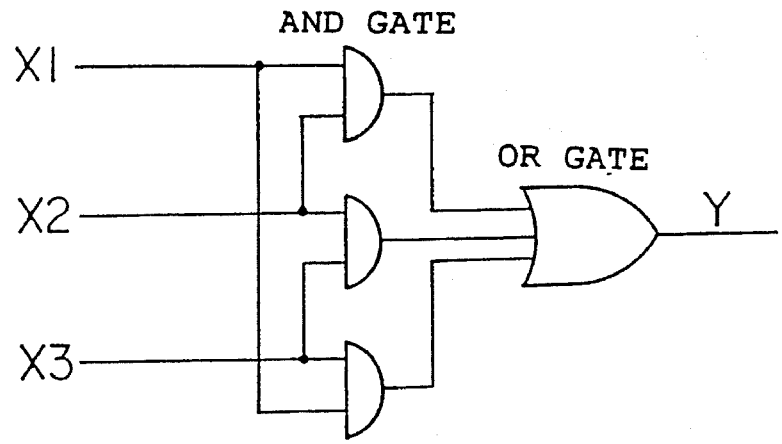
FIG. 21(A) is a diagram showing the arrangement of the majority logic circuit.
FIG. 21(B) is a logical expression illustrating the process executed by the majority logic circuit.
FIG. 21(C) is a truth table according to which the majority logic circuit operates.
Figure 22:
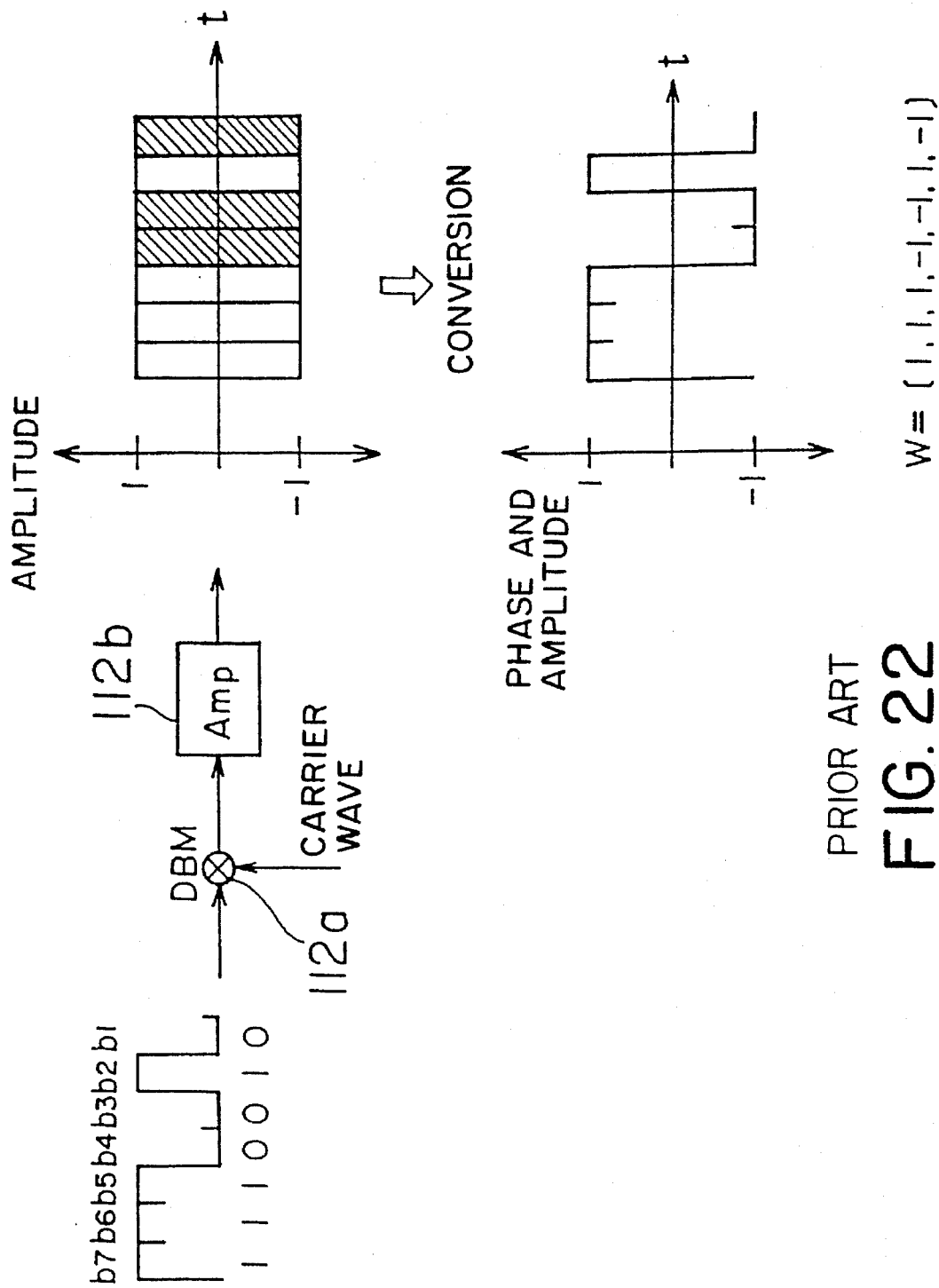
FIG. 22 is a diagram illustrating the operation of a double balanced modulator.

FIGS. 5(A) and 5(B) schematically illustrate the arrangement of the communication device associated with the up channels CH1 to CH3, wherein FIG. 5(A) shows a transmitting section and FIG. 5(B) shows a receiving section. In the transmitting section, three PN code generators 40a to 40c generate respective different PN codes 1 to 3 each having a code length of "7". Three exclusive-OR (EX-OR) circuits 41a to 41c derive exclusive-ORs based on data from the channels CH1 to CH3 and the PN codes 1 to 3, respectively, and output the exclusive-ORs to a majority logic circuit 42. The majority logic circuit 42 performs a majority operation on the signals belonging to the same time slot, and outputs a signal value corresponding to a majority of the exclusive-OR outputs which are binary signals, to a modulator (PSKMOD) 43. The modulator 43 subjects a carrier wave having frequency $f_1$ to binary phase-shift keying modulation by using the output of the majority logic circuit 42, and transmits the modulated signal. The arrangement of this communication device is basically identical with that of the transmitting apparatus shown in FIG. 17, but the majority logic circuit 42 is designed to control the number of multiplexed channels in accordance with multiplex number control signals supplied from a multiplex number control circuit 53, as described later with reference to FIG. 6(B). The internal arrangement of the majority logic circuit 42 will be explained later with reference to FIG. 9.

In the receiving section, a demodulator (PSKDEM) 44 extracts the baseband signal from the received signal by means of synchronous detection, and outputs the demodulated signal to a PN code demodulator 45. The PN code demodulator 45 demodulates the PN codes for the individual channels, based on PN codes 1 to 3 respectively identical to the PN codes 1 to 3 of the transmitting side, and outputs the thus-restored data. Also, the PN code demodulator 45 detects correlation values for the individual channels and supplies the detected values to a multiplex number control circuit 46. Based on the input correlation values, the multiplex number control circuit 46 produces multiplex number control signals, which are supplied to a transmitting section and majority logic circuit 49 shown in FIG. 6(A) described later. The correlation values represent a degree of bit-by-bit signal coincidence at which the PN code of the receiving side coincides with the signal spread at the transmitting side by PN code modulation. The correlation values decrease with increase in external noise. The internal arrangement of the PN code demodulator 45 will be explained later with reference to FIG. 7.

Figure 6A:
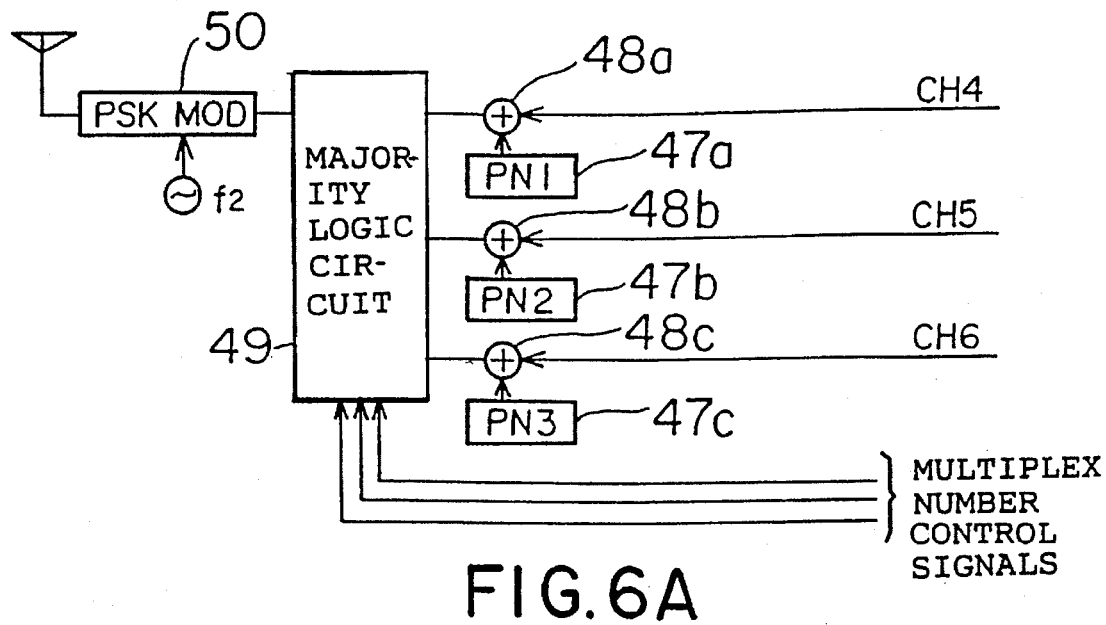
FIG. 6(A) is a diagram schematically showing the arrangement of a transmitting section of a communication device for down channels CH4 to CH6.
Figure 6B:
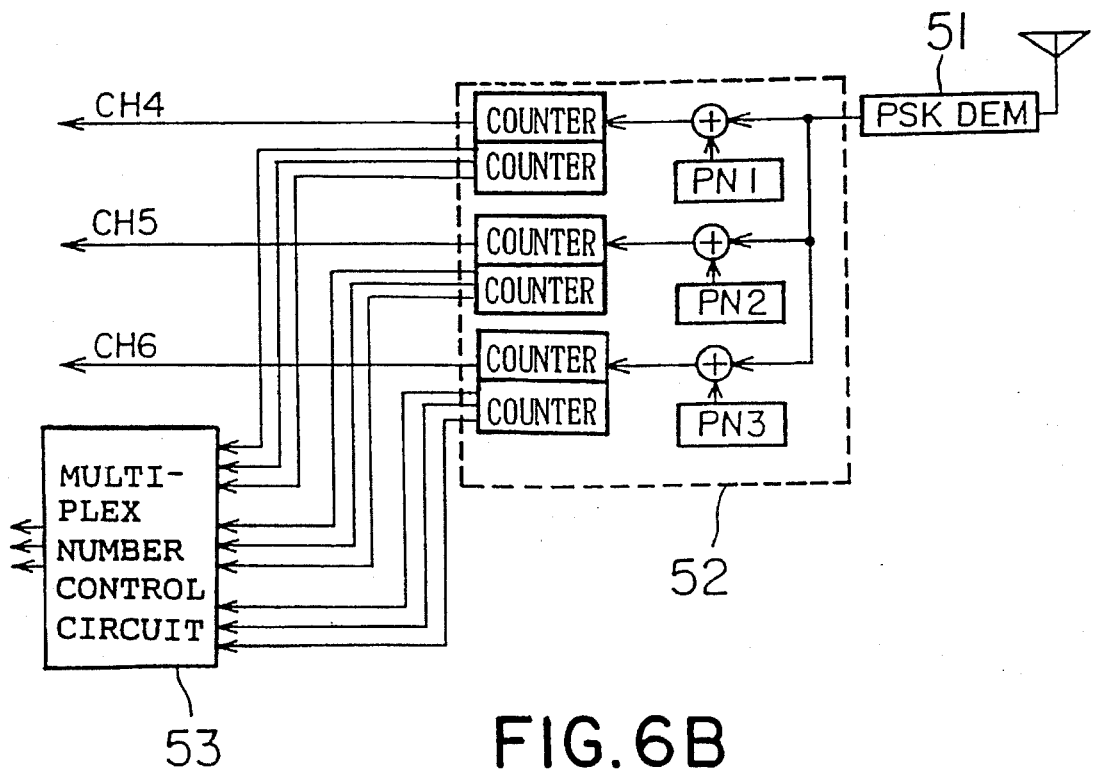
FIG. 6(B) is a diagram schematically showing the arrangement of a receiving section of the communication device for the down channels CH4 to CH6.

FIGS. 6(A) and 6(B) schematically illustrate the arrangement of the communication device associated with the down channels CH4 to CH6, wherein FIG. 6(A) shows a transmitting section and FIG. 6(B) shows a receiving section. In the transmitting section, three PN code generators 47a to 47c generate respective different PN codes 1 to 3 each having a code length of "7". Three exclusive-OR (EX-OR) circuits 48a to 48c derive exclusive-ORs based on data from the channels CH4 to CH6 and the PN codes 1 to 3, respectively, and output the exclusive-ORs to a majority logic circuit 49. The majority logic circuit 49 performs a majority operation on the signals belonging to the same time slot, in accordance with the multiplex number control signals supplied from the multiplex number control circuit 46 in FIG. 5(B), and outputs a signal value corresponding to a majority of the exclusive-OR outputs which are binary signals, to a modulator (PSKMOD) 50. The internal arrangement of the majority logic circuit 49 will be explained later with reference to FIG. 9. The modulator 50 subjects a carrier wave having frequency $f_2$ different from the frequency $f_1$ to binary phase-shift keying modulation by using the output of the majority logic circuit 49, and transmits the modulated signal. The arrangement of this communication device is basically identical with that shown in FIG. 5(A).

In the receiving section, a demodulator (PSKDEM) 51 extracts the baseband signal from the received signal by synchronous detection, and outputs the demodulated signal to a PN code demodulator 52. The PN code demodulator 52 demodulates the PN codes for the individual channels, based on PN codes 1 to 3 respectively identical to the PN codes 1 to 3 of the transmitting side, and outputs the thus-restored data. Also, the PN code demodulator 52 detects correlation values for the individual channels and supplies the detected values to a multiplex number control circuit 53. Based on the input correlation values, the multiplex number control circuit 53 produces multiplex number control signals, which are supplied to the transmitting section and majority logic circuit 42 shown in FIG. 5(A). The internal arrangement of the PN code demodulator 52 will be explained later with reference to FIG. 7. The arrangement of this receiving section is basically identical with that shown in FIG. 5(B).

In the arrangement of the second embodiment, data communication is first effected via the up channel CH1 alone. In this case, the correlation value is detected by the PN code demodulator 45 of the receiving side, and an optimum number of multiplexed channels is determined by the multiplex number control circuit 46. The multiplex number control signal is sent to the transmitting-side majority logic circuit 49 associated with the down channel. Also, the multiplex number control signal is contained in data to be transmitted via the down channel, and thus is supplied to the transmitting-side majority logic circuit 42 associated with the up channel. The majority logic circuits 49 and 42 individually control the multiplex number in accordance with the multiplex number control signals supplied thereto.

Thereafter, the receiving-side PN code demodulators 45 and 52 associated with the up and down channels, respectively, detect the correlation values, to thereby monitor a change of the correlation values detected by the multiplex number control circuits 46 and 53, respectively. Consequently, when there occurs a change in the correlation values, the multiplex number control circuit 46 or 53 determines a new optimum multiplex number and supplies the multiplex number control signal to the majority logic circuit 42 or 49. The multiplex number control signal causes the multiplex number control circuit 46 or 53 to reduce the number of multiplexed channels when the correlation value is decreased, and causes the circuit 46 or 53 to increase the number of multiplexed channels when the correlation value is increased. Controlling the number of multiplexed channels in accordance with the correlation values is equivalent to controlling the transmission speed of the communication apparatus as a whole in accordance with the transmission quality.

The internal arrangement of the PN code demodulators 45 and 52 will be now described. These two demodulators have an identical arrangement, and a basic configuration thereof is such that the three channels are each associated with the PN code demodulator shown in FIG. 3. The PN code demodulators 45 and 52 are, however, constructed slightly differently from that shown in FIG. 3, and accordingly, only the different part is explained with reference to FIG. 7.

Figure 7:
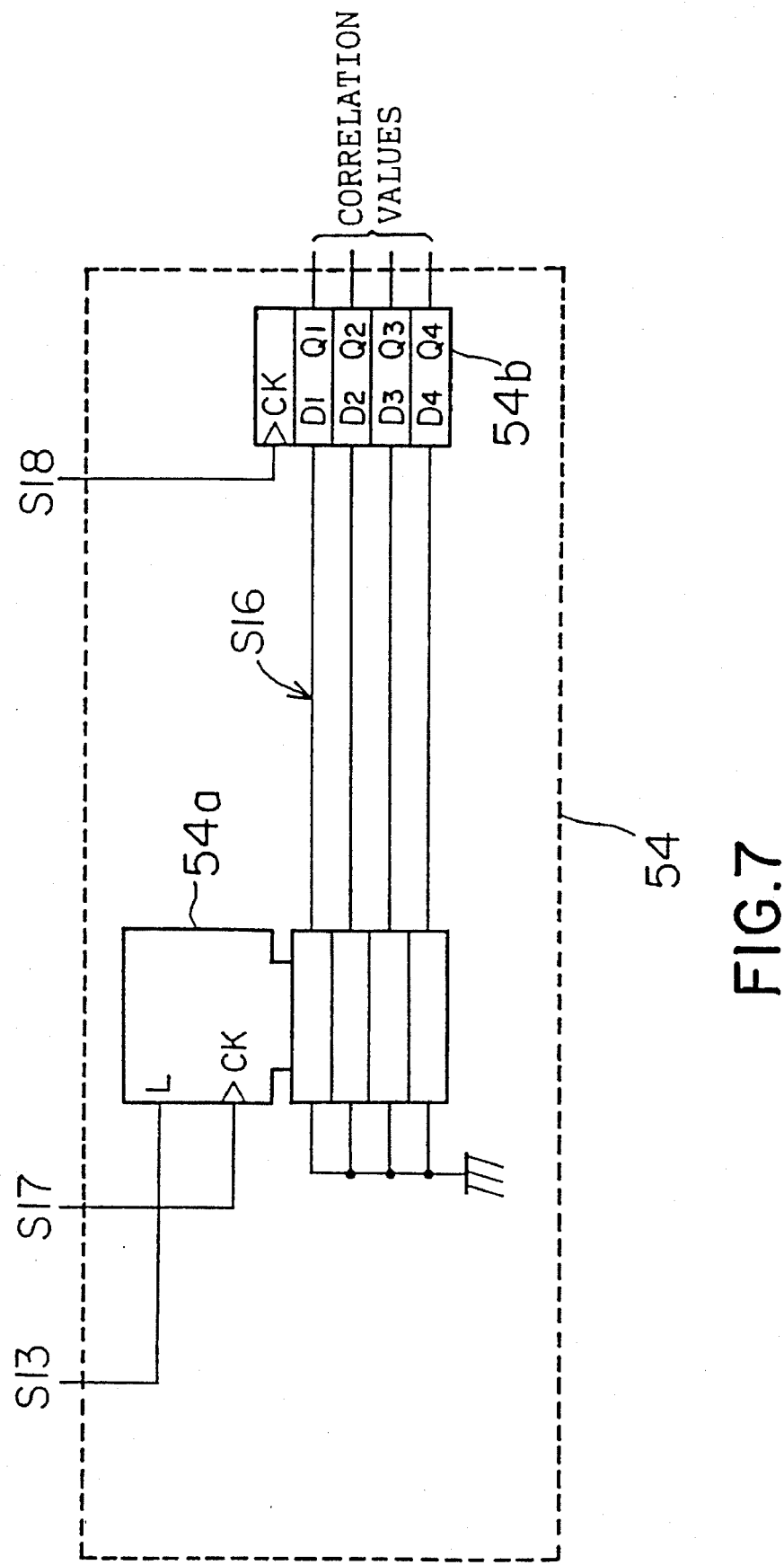
FIG. 7 is a diagram showing the arrangement of a correlation value counting section.

FIG. 7 illustrates the different part of the demodulator associated with one channel. Specifically, a correlation value counting section 54 is added to the PN code demodulator of FIG. 3. The correlation value counting section 54 comprises a counter 54a and a D-FF 54b. The data clock pulse S13 from the D-FF 33b in FIG. 3 is supplied to the L terminal of the counter 54a, and the output S17 from the AND circuit 33c in FIG. 3 is supplied to the CK terminal of the counter 54a. A count number S16 of the counter 54a is supplied in parallel to $D_1$, $D_2$, $D_3$ and $D_4$ terminals of the D-FF 54b. The data clock pulse S18, which is the output of the inverter 33h, is supplied to the CK terminal of the D-FF 54b, and correlation values are output in parallel from $Q_1$, $Q_2$, $Q_3$ and $Q_4$ terminals of the D-FF 54b.

Figure 8:
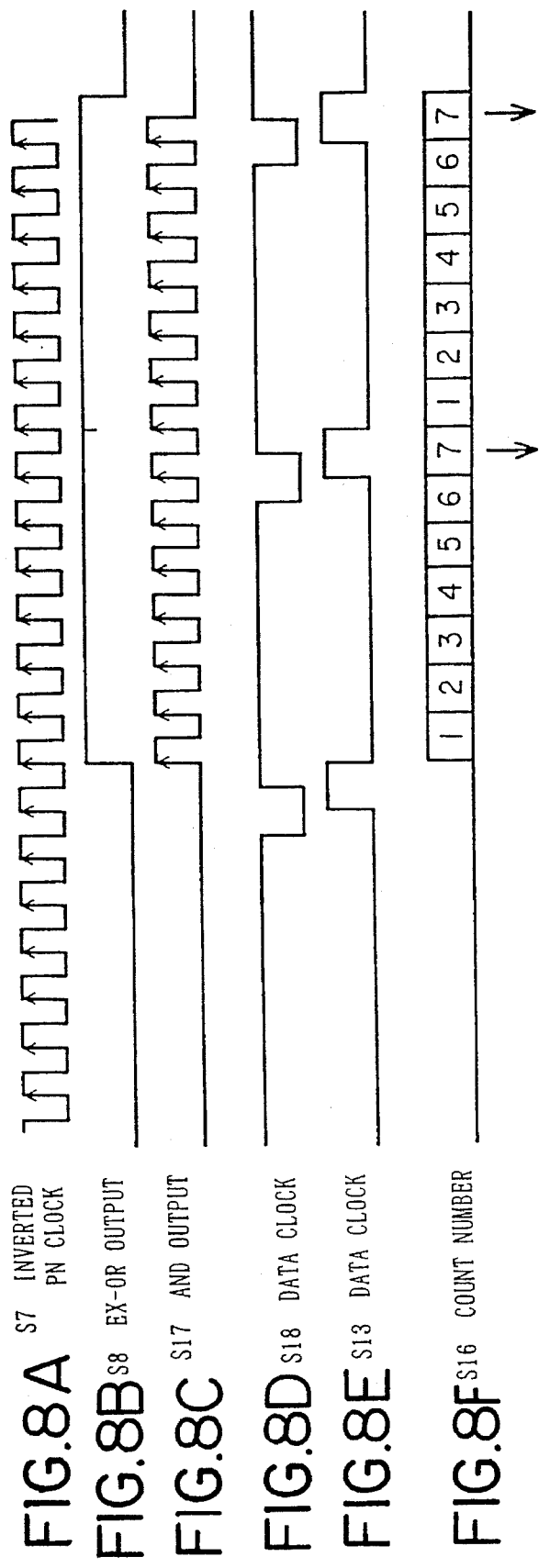
FIG. 8 is a timing chart showing signals at various parts in the correlation value counting section.

FIG. 8 is a timing chart showing signals at various parts in the correlation value counting section 54. In the figure, an output S17 corresponds to the result of an AND operation performed on the inverted PN clock pulse S7 from the inverter 33a in FIG. 3 and the output S8 of the exclusive-OR operation section 31, and a data clock pulse S18 is a signal obtained by inverting the data clock pulse S12 in FIG. 3. Referring also to FIG. 8, the correlation value counting section 54 is explained.

The counter 54a comprises a 4-bit counter, is loaded with "0000" when a high-level signal is supplied to the L terminal, and counts up each time a pulse is supplied thereafter to the CK terminal. In the D-FF 54b, when an up edge is input to the CK terminal, the signals then supplied to the $D_1$, $D_2$, $D_3$ and $D_4$ terminals are output from the $Q_1$, $Q_2$, $Q_3$ and $Q_4$ terminals, respectively. Accordingly, in the example shown in FIG. 8, the count number S16 of the counter 54a changes as indicated in hexadecimal notation at the bottom of the figure, and the correlation values output from the D-FF 54b are each "7". If noise is contained during transmission and a code error occurs, the correlation values decrease.

Figure 9:
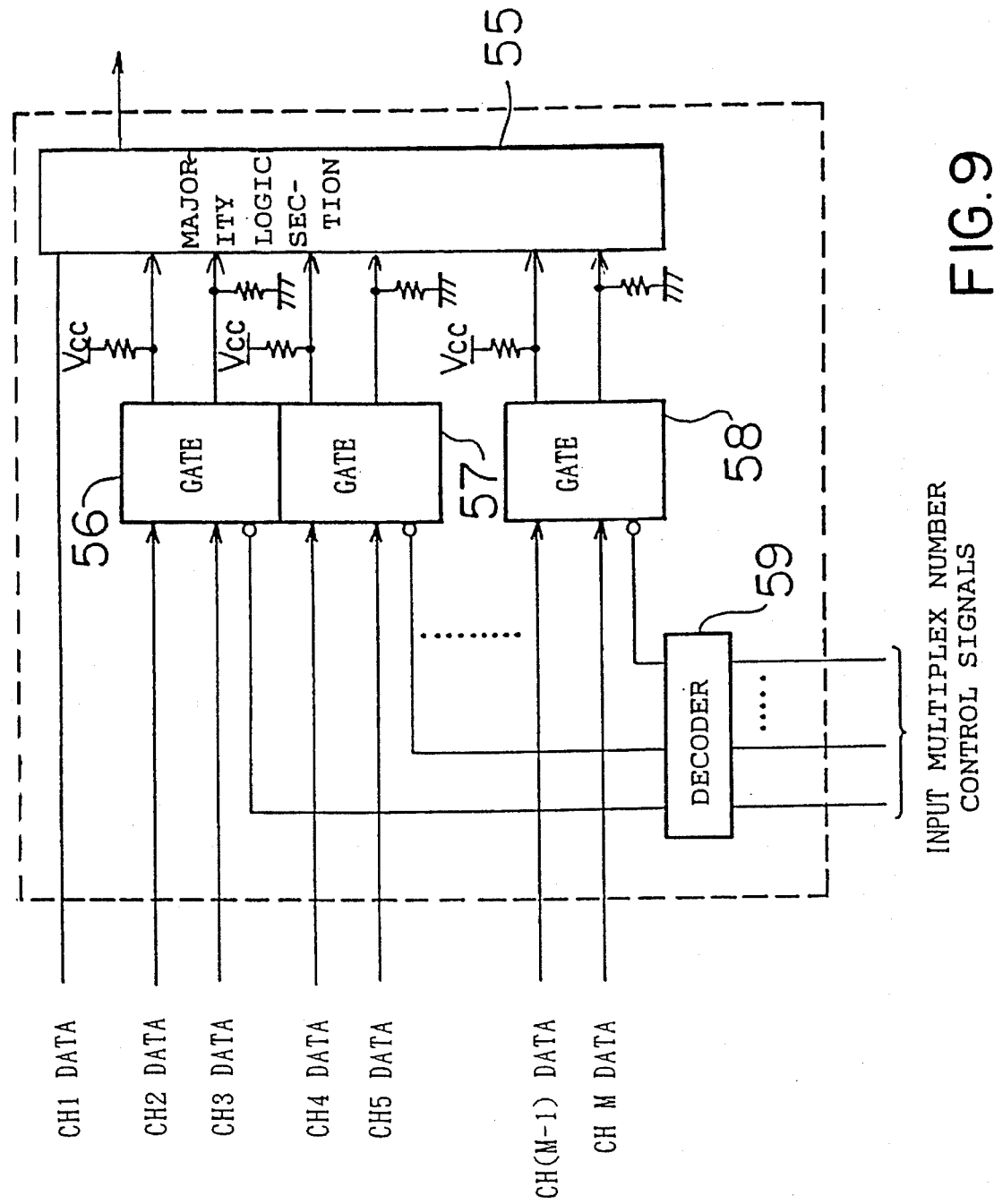
FIG. 9 is a block diagram showing the internal arrangement of a majority logic circuit.

FIG. 9 is a block diagram showing the internal arrangement of the aforementioned majority logic circuits 42 and 49. The following description is based on the assumption that M channels (M: odd number) of data are input to the majority logic circuit. The majority logic circuits 42 and 49 have an identical arrangement.

As shown in FIG. 9, among the outputs (CH1 data to CHM data) from the exclusive-OR circuits of the transmitting side, only CH1 data is directly supplied to a majority logic section 55. The CH2 data and the CH3 data are supplied to the majority logic section 55 via a gate 56, the CH4 data and the CH5 data are supplied to the section 55 via a gate 57, and the CH(M-1) data and the CHM data are supplied to the section 55 via a gate 58. The gates 56 to 58 are each supplied with a gate control signal from a decoder 59. The decoder 59 generates the gate control signals in accordance with the multiplex number control signals supplied from the multiplex number control circuit.

When supplied with the multiplex number control signals indicating that the number of channels to be multiplexed is M, for example, the decoder 59 outputs a low-impedance gate control signal to each of the gates 56 to 58. Consequently, each of the gates 56 to 58 opens, whereby the CH2 data to CHM data are input directly to the majority logic section 55. If, on the other hand, the decoder 59 is supplied with the multiplex number control signals indicating that the number of channels to be multiplexed is "3" (the multiplex number is always commanded by an odd number), a low-impedance gate control signal is supplied to the gate 56 while a high-impedance gate control signal is supplied to each of the gates 57–58. As a result, the gate 56 opens, permitting the CH2 data and CH3 data to be supplied directly to the majority logic section 55, while the gates 57–58 are closed. Each gate has an even-numbered channel output connected to a voltage $V_{cc}$ and an odd-numbered channel output grounded. Accordingly, the gates 57–58 thus closed output the signal "1" from the even-numbered channel terminal and the signal "0" from the odd-numbered channel terminal, to the majority logic section 55, regardless of the values of the data CH4–CHM.

Therefore, although data is supplied from the channels CH4 to CHM, the data input to the majority logic section never affects the result of the majority operation. This is virtually equivalent to the state in which data is supplied only from the channels CH1 to CH3, and thus 3-channel multiplexing is carried out.

Thus, the majority logic circuit can easily change the number of multiplexed channels in accordance with the multiplex number control signals supplied thereto; namely, it can change the multiplex number without the need to change the hardware in particular.

In the second embodiment described above, each of the PN code demodulators 45 and 52 is composed of three channels of the PN code demodulators of the first embodiment shown in FIG. 3 and the correlation value counting sections of FIG. 7. Alternatively, each of the PN code demodulators 45 and 52 may be composed of three channels of PN code demodulators shown in FIG. 10.

Figure 10:
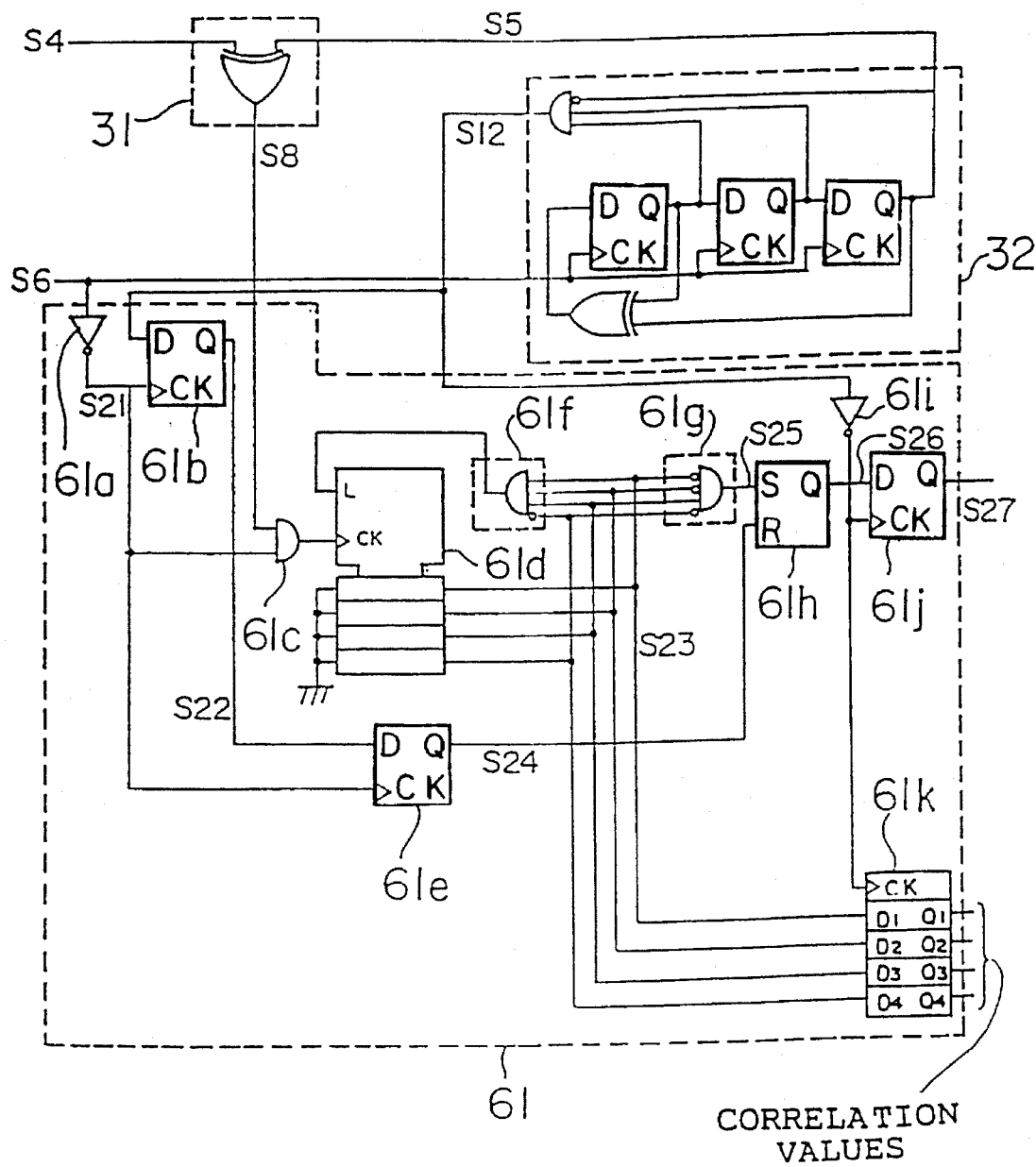
FIG. 10 is a block diagram of a PN code demodulator including a correlation value counting section, according to another embodiment of the present invention.

FIG. 10 is a block diagram of a PN code demodulator including a correlation value counting section, according to another embodiment of the present invention. This PN code demodulator includes elements identical to those used in the PN code demodulator shown in FIG. 3; therefore, like reference numerals are used to indicate such elements and description thereof is omitted.

The PN code demodulator of FIG. 10 has a threshold/correlation value counting section 61 different from that used in the PN code demodulator of FIG. 3. Specifically, the threshold/correlation value counting section 61 comprises an inverter 61a, a D-FF 61b, an AND circuit 61c, a counter 61d, a D-FF 61e, decoders 61f and 61g, an SR-FF 61h, an inverter 61i, and D-FFs 61j and 61k. The arrangement and operation of the threshold/correlation value counting section 61 will be explained in detail with reference to FIG. 11.

Figure 11:
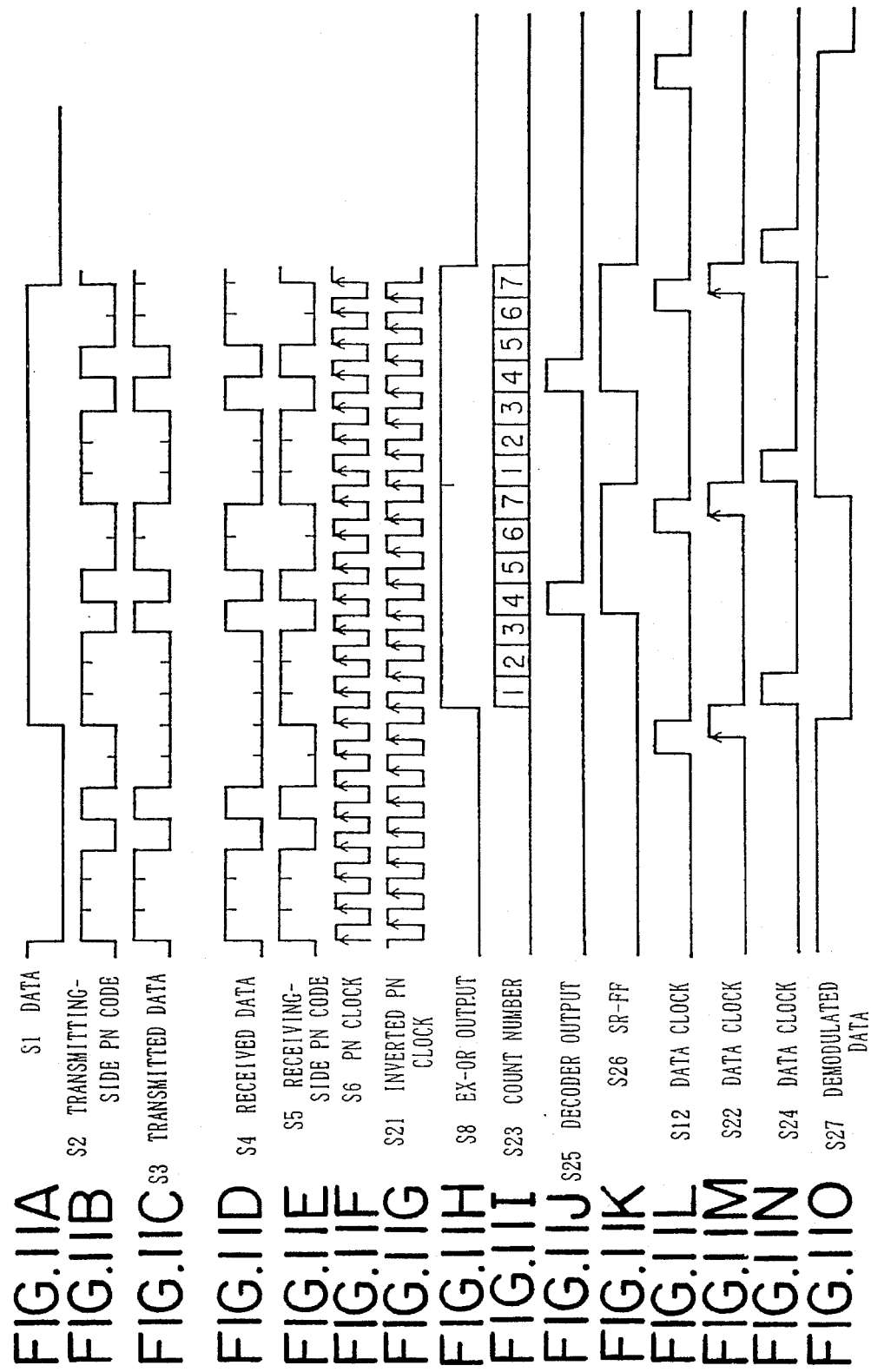
FIG. 11 is a timing chart showing signal waveforms at various parts in the PN code demodulator of FIG. 10.
Figure 12:
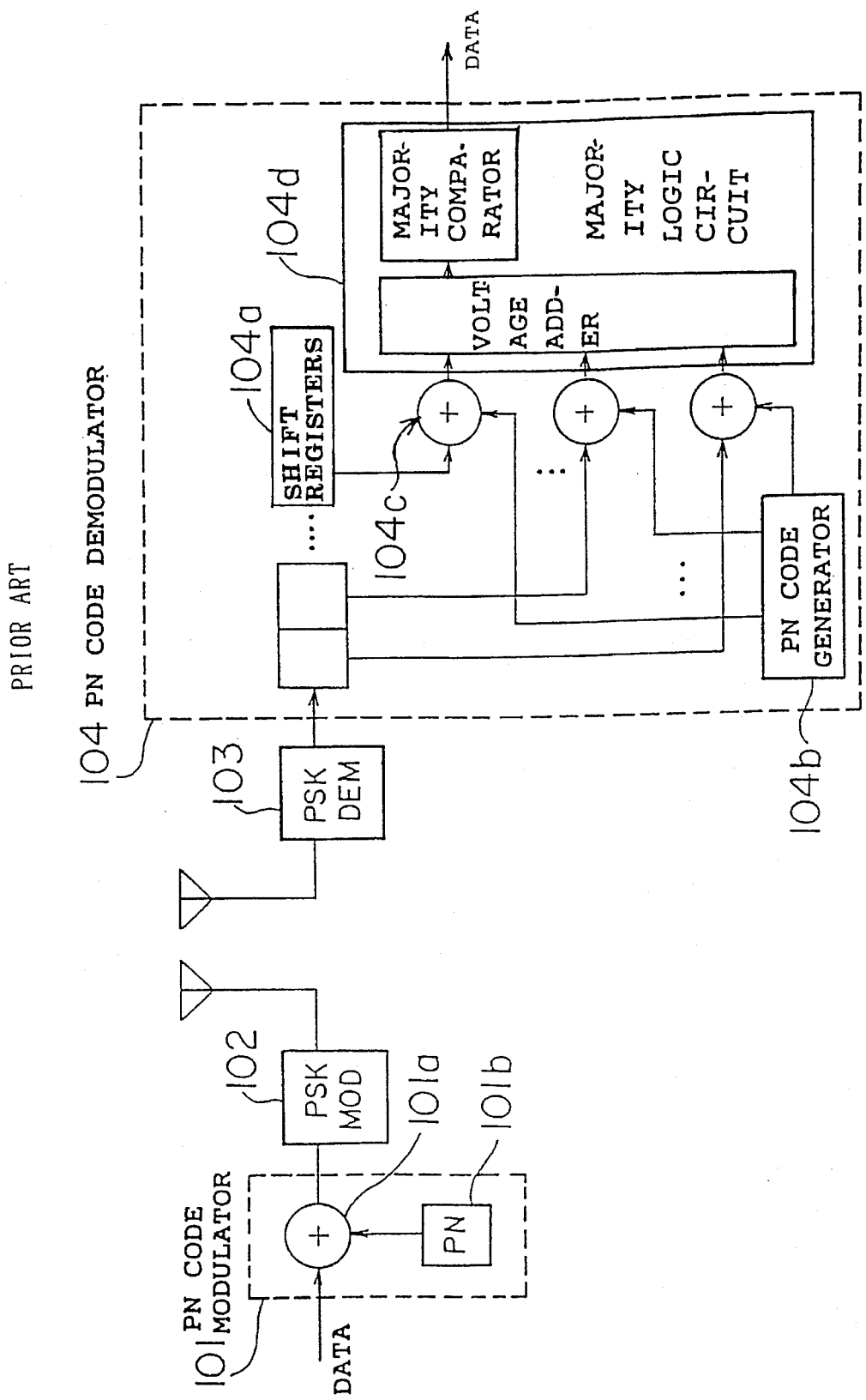
FIG. 12 is a schematic diagram of a conventional spread spectrum communication system.
Figure 13:
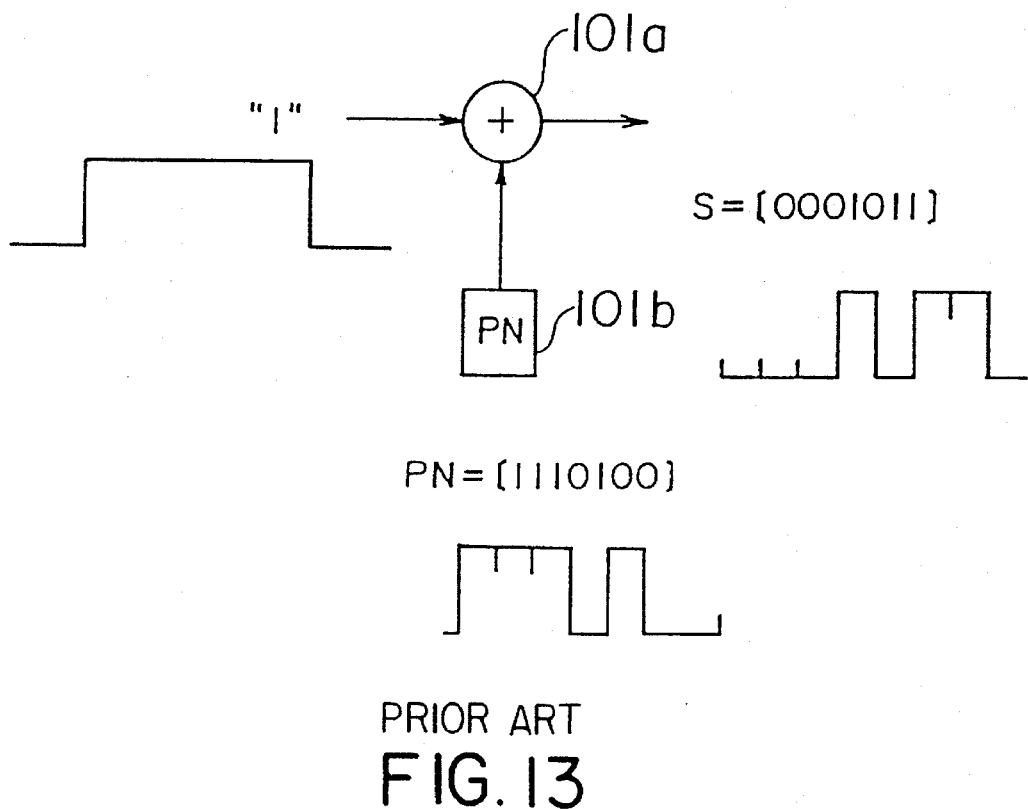
FIG. 13 is a diagram illustrating the operation of a PN code modulator.
Figure 14:
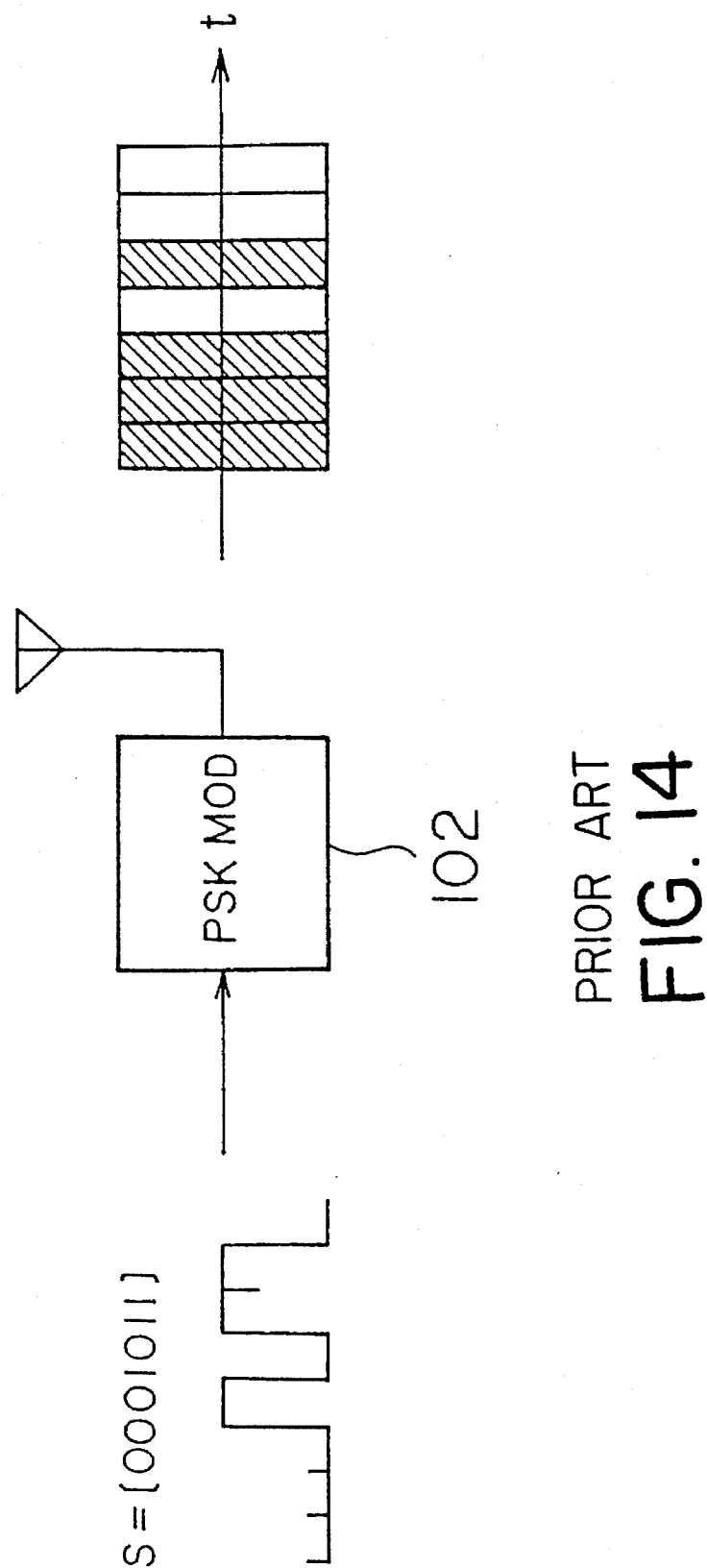
FIG. 14 is a diagram illustrating the operation of a binary phase-shift keying modulator.
Figure 15:
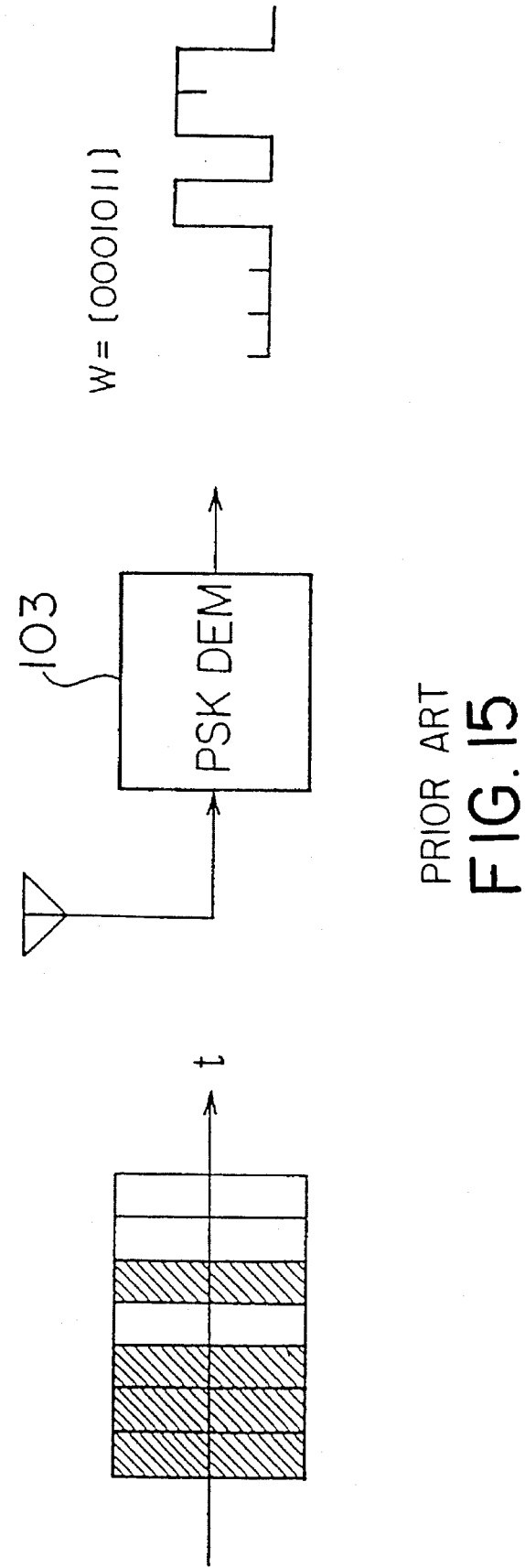
FIG. 15 is a diagram illustrating the operation of a synchronous detector.
Figure 16:
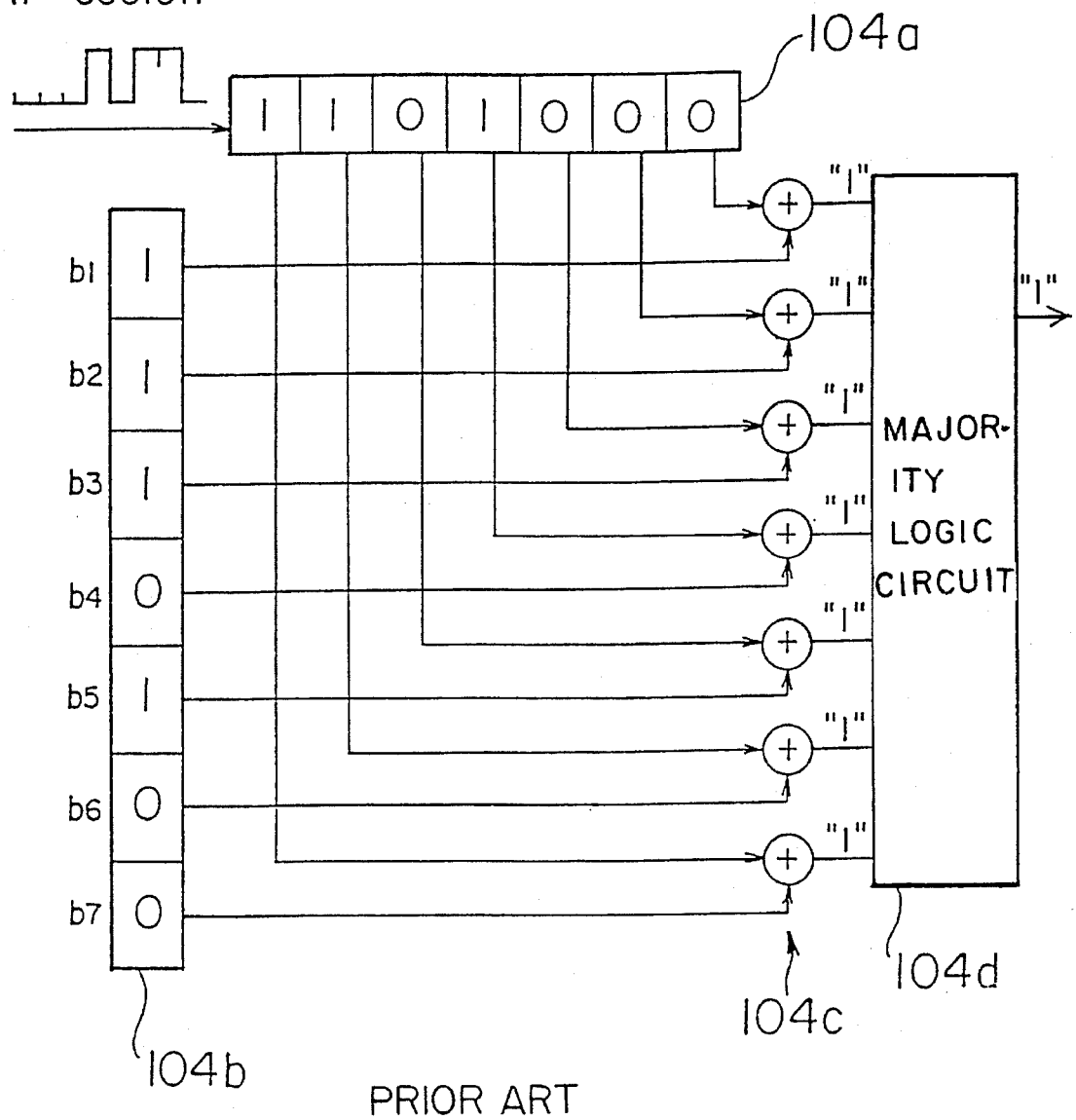
FIG. 16 is a diagram illustrating the operation of a PN code demodulator.

FIG. 11 is a timing chart showing signal waveforms at various parts in the PN code demodulator of FIG. 10. In the figure, signals S1 to S6, S8 and S12 have waveforms identical to those of the corresponding signals shown in FIG. 4.

The CK terminal of the D-FF 61b is supplied with an inverted PN clock pulse S21, which is obtained by inverting the PN clock pulse S6 at the inverter 61a. Thus, a data clock pulse S22 delayed by one bit of the PN clock pulse is output from the Q terminal of the D-FF 61b to the D terminal of the D-FF 61e.

The AND circuit 61c is supplied with the inverted PN clock pulse S21 and the output S8 of the exclusive-OR operation section 31, and outputs the result of the AND operation to the CK terminal of the counter 61d. The 4-bit count value of the counter 61d is supplied in parallel to the decoders 61f and 61g, and also supplied in parallel to $D_1$, $D_2$, $D_3$ and $D_4$ terminals of the D-FF 61k. When the count value supplied to the decoder 61f reaches "0111" ("7" in hexadecimal notation), the decoder 61f outputs a high-level signal to the L terminal of the counter 61d, whereby the value "0000" is loaded into the counter 61d. Accordingly, the count value of the counter 61d changes as indicated at S23 in FIG. 11. The count number S23 is expressed in hexadecimal notation.

When the count value supplied to the decoder 61g reaches "0100" ("4" in hexadecimal notation), the decoder 61g provides a decoder output S25 to the S terminal of the SR-FF 61h. On the other hand, the CK terminal of the D-FF 61e is supplied with the inverted PN clock pulse S21, and accordingly, a data clock pulse S24, which is delayed from the data clock pulse S22 by one bit of the PN clock pulse, is output from the Q terminal of the D-FF 61e to the R terminal of the SR-FF 61h. Thus, an SR-FF output S26 is supplied from the Q terminal of the SR-FF 61h to the D terminal of the D-FF 61j. Since the CK terminal of the D-FF 61j is supplied with a signal obtained by inverting the data clock pulse S12 at the inverter 61i, the D-FF 61j outputs demodulated data S27 from the Q terminal thereof. Namely, the demodulated data S27 is equivalent to the data S1 of the transmitting side and is delayed therefrom by one bit. Thus, the data S1 can be reliably restored at the receiving side.

In the D-FF 61k, when an up edge is input to the CK terminal, signals then supplied to the $D_1$, $D_2$, $D_3$ and $D_4$ terminals are output via the $Q_1$, $Q_2$, $Q_3$ and $Q_4$ terminals, respectively. In the example shown in FIG. 11, therefore, the correlation values output from the D-FF 61k are each "7" in hexadecimal notation.

As described above, the PN code demodulator shown in FIG. 11 carries out the restoration of data and the detection of correlation values by means of a single counter. Also in this case, where the PN code length is n, data can be reliably restored as long as the number of noise-affected bits is smaller than or equal to $[(n+1)/2-1]$.

In the second embodiment described above, the multiplex number control circuits 46 and 53 generate multiplex number control signals in accordance with the correlation values supplied thereto. Alternatively, the multiplex number control circuits 46 and 53 may be each designed to calculate noise immunity values based on the input correlation values so that the multiplex number control signals may be generated on the basis of the noise immunity values.

Prior to describing the method of calculating the noise immunity values, the usefulness of the noise immunity values is explained. In the second embodiment, the majority logic circuits 42 and 49 are provided at the respective transmitting sides; in this case, situations may arise wherein the correlation values do not reach the PN code length, though no external noise is contained. Here, let it be assumed that the demodulator 44 of FIG. 5(B) demodulates a received signal free from noise and acquires demodulated data "1110010" (identical to the result of the operation output from the majority logic circuit 111 of FIG. 20 and corresponding to one frame of the PN code), the demodulated data being supplied to the PN code demodulator 45. In this case, the results of the exclusive-OR operations (indicated by symbol "(+)") performed on the demodulated data and the PN codes 1 to 3 for the respective channels are as follows:

CH1: "1110010" (+) "1110100"="0000110"
CH2: "1110010" (+) "0111010"="1001000"
CH3: "1110010" (+) "0011101"="1101111"

Based on the results of the operations, data "001" is restored, as mentioned above. Since, in this case, no noise is contained in the course of transmission, the results of the exclusive-OR operations should originally be those indicated below, and the correlation values should be equivalent to the PN code length.

CH1: "0000000"
CH2: "0000000"
CH3: "1111111"

These values are not derived because the majority logic circuit 42 is provided at the transmitting side and a majority logic operation is carried out there. The magnitude of the difference between the correlation value and the PN code length depends on the other channel data, code length, and multiplex number.

Thus, even in the case where no noise exists, the correlation value can be smaller than the PN code length. For this reason, it is not always desirable that the multiplex number control circuits 46 and 53 of the second embodiment determine the multiplex number based solely on the correlation values to generate multiplex number control signals. Therefore, the concept of noise immunity is introduced.

Specifically, the noise immunity value is defined as follows:

Noise immunity value=Correlation value–(PN code length+1)/2

In the above example, the noise immunity values are computed as follows:

CH1: 5–(7+1)/2=1

CH2: 5−(7+1)/2=1

CH3: 6−(7+1)/2=2

Thus, in the aforesaid case where the code length is "7" and 3-channel multiplexing is carried out, the number of channels must be switched from "3" to "1" when the noise immunity value decreases even by one bit.

Based on the foregoing, the multiplex number control circuits 46 and 53 of the second embodiment calculate the noise immunity values in accordance with the input correlation values and generate the multiplex number control signals in accordance with the calculated values. In this case, the number of multiplexed channels can be appropriately controlled, though the majority logic circuits 42 and 49 are provided at the respective transmitting sides.

The above description of the embodiments is based on the assumption that the PN code length is "7". Usually, however, the PN code length is several hundreds to several thousands of bits. Even in such case, the operation associated with the PN codes is the same as described above. For example, in the case where the PN code length is "1001" and the correlation value is "800", then Noise immunity value=800−(1001+1)/2=299.

This means that reliable data restoration is ensured even if the number of noise-affected bits is "299", and also that the number of multiplexed channels can be increased.

In the second embodiment, the majority logic circuit shown in FIG. 9 is used to readily change the multiplex number. Alternatively, a majority logic circuit with a conventional arrangement may be used; in this case, the PN code generator associated with a non-multiplexed channel generates different predetermined codes for the odd- and even-numbered channels.

As described above, in the PN code demodulator according to the present invention, an exclusive-OR of the PN code and the baseband signal modulated by means of the PN code is derived, and based on the exclusive-OR thus derived, the counting means counts the number of anticoincidence bits at which the baseband signal does not coincide with the PN code, over the predetermined code length. The data signal is restored in accordance with whether the count value is greater than the value (predetermined code length+1)/2. Accordingly, it is unnecessary to provide shift registers and exclusive-OR circuits corresponding in number to the PN code length, unlike the conventional demodulator, and the hardware can be reduced in size.

In the code-division multiplex communication apparatus using the PN code demodulator, the correlation values are obtained based on the count value of the counting means, and the number of multiplexed channels is controlled in accordance with the correlation values. It is, therefore, possible to obtain the correlation values during communications, and also to immediately change the number of multiplexed channels in accordance with external noise. In other words, the data transmission speed can be controlled in accordance with the transmission quality.

Further, the gate means are provided on the input side of the majority value detecting means and are each connected to two channels. When the binary signals are to be interrupted, each gate means simultaneously supplies binary signals of two different values from the respective two channels to the majority value detecting means, regardless of the values of the binary signals. This permits the number of multiplexed channels to be changed without the need to change the hardware. Namely, control operations of an analog circuitry, such as control of the bandwidths of filters or the transmission power of the individual channels, are unnecessary.

Figure 23:
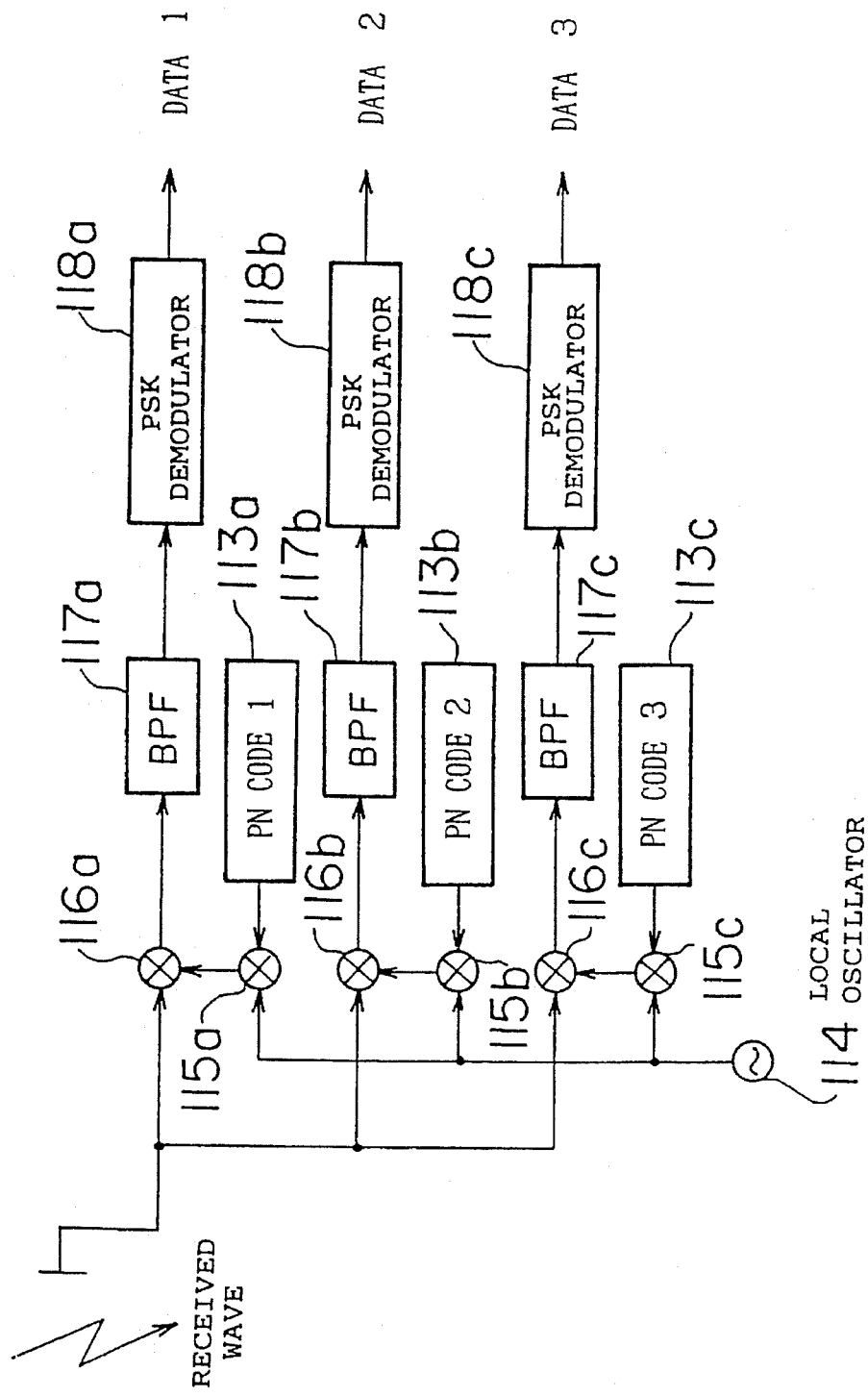
FIG. 23 is a diagram showing the basic arrangement of a conventional receiving apparatus used for code-division multiplex communications.
Figure 24:
FIG. 24 is a diagram illustrating the phase modulation of a PN code.
Figure 25:
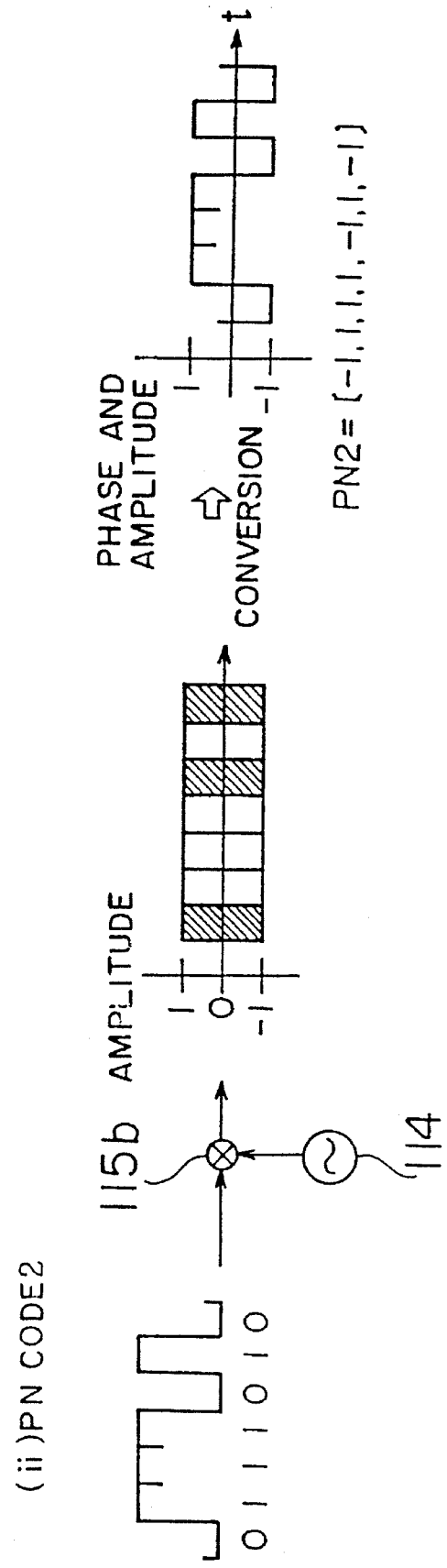
FIG. 25 is a diagram illustrating the phase modulation of another PN code.

Furthermore, the code-division multiplex communication apparatus using the PN code demodulator does not require the PSK demodulators shown in FIG. 23, which are provided for the respective channels in the conventional apparatus. Thus, it is not necessary to adjust the PSK demodulator associated with each of the channels.

Further, the noise immunity values are determined based on the correlation values, and the multiplex number control signals are generated in accordance with the determined noise immunity values. This permits the number of multiplexed channels to be appropriately controlled in cases where the majority logic circuit is provided at the transmitting side.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A PN code demodulator for demodulating a baseband signal modulated by a PN code, comprising:

PN code generating means for generating a PN code having a predetermined code length and identical with that generated at a modulating side;

exclusive-OR means for deriving an exclusive-OR of the PN code generated by said PN code generating means and the baseband signal modulated by the PN code;

counting means for counting a number of anticoincidence bits at which the baseband signal does not coincide with the PN code, based on an output of said exclusive-OR means over the predetermined code length;

determining means for outputting a detection signal when the number of anticoincidence bits counted by said counting means has reached a value of (the predetermined code length+1)/2; and restoring means for restoring a data signal in accordance with the detection signal output from said determining means.

2. The PN code demodulator according to claim 1, further comprising correlation value output means for outputting, as a correlation value, the number of anticoincidence bits counted by said counting means over the predetermined code length.

3. A code-division multiplex communication apparatus including a transmitting section for modulating data signals by PN codes and transmitting the modulated signals via a plurality of channels, respectively, and a receiving section for demodulating received signals by PN codes to restore the data signals associated with the respective channels, the code-division multiplex communication apparatus comprising:

a plurality of transmitting-side PN code generating means provided at the transmitting section and associated with the respective channels, for generating respective different PN codes having a predetermined code length;

a plurality of transmitting-side exclusive-OR means provided at the transmitting section and associated with the respective channels, for individually deriving an exclusive-OR of a corresponding data signal and the PN code generated by a corresponding one of said transmitting-side PN code generating means;

majority determining means provided at the transmitting section, for controlling a multiplex number in accordance with a multiplex number control signal supplied thereto and for determining a majority of outputs of said transmitting-side exclusive-OR means on a time-slot basis to output a multiplex data signal;

digital modulating means provided at the transmitting section, for digitally modulating a carrier wave by means of the multiplex data signal supplied from said majority determining means;

digital demodulating means provided at the receiving section, for digitally demodulating the multiplex data signal from a received signal;

a plurality of receiving-side PN code generating means provided at the receiving section and associated with the respective channels, for respectively generating PN codes identical with those generated by corresponding ones of said transmitting-side PN code generating means;

a plurality of receiving-side exclusive-OR means provided at the receiving section and associated with the respective channels, for individually deriving an exclusive-OR of the multiplex data signal demodulated by said digital demodulating means and the PN code generated by a corresponding one of said receiving-side PN code generating means;

a plurality of PN code demodulating means provided at the receiving section and associated with the respective channels, for individually demodulating the PN code in accordance with an output from a corresponding one of said receiving-side exclusive-OR means and for obtaining a correlation value for each said predetermined code length.; and multiplex number control means for generating the multiplex number control signal in accordance with the correlation values obtained by said plurality of PN code demodulating means and supplying the generated multiplex number control signal to said majority determining means provided at the transmitting section.

4. The code-division multiplex communication apparatus according to claim 3, wherein said multiplex number control means generates the multiplex number control signal such that a number of multiplexed channels is reduced when the correlation values decrease and is increased when the correlation values increase.

5. The code-division multiplex communication apparatus according to claim 3, wherein said majority determining means includes majority value detecting means for detecting a signal value which is a majority of values of binary signals input thereto in parallel from a plurality of channels, and outputting the detected signal value, the channels being odd in number, and at least one gate means connected to an input side of said majority value detecting means and associated with two of the channels, for effecting passage or interception of the binary signals in accordance with the majority number control signal.

6. The code-division multiplex communication apparatus according to claim 5, wherein said gate means effects the passage of the binary signals by supplying the binary signals from the corresponding two channels directly to said majority value detecting means, and effects the interception of the binary signals by simultaneously supplying binary signals of two different values to said majority value detecting means, regardless of values of the binary signals from the two channels associated therewith.

7. The code-division multiplex communication apparatus according to claim 3, wherein said multiplex number control means determines noise immunity values based on the respective correlation values obtained by said plurality of PN code demodulating means, generates the multiplex number control signal in accordance with the noise immunity values thus determined, and supplies the generated multiplex number control signal to said majority determining means provided at the transmitting side.

* * * * *